US007199811B2

(12) United States Patent
Goto et al.

(10) Patent No.: US 7,199,811 B2

(45) Date of Patent: Apr. 3, 2007

(54) IMAGE RECORDING MEDIA AND IMAGE RECORDING METHOD

(75) Inventors: Yasutomo Goto, Fujinomiya (JP); Shuji Kanayama, Fujinomiya (JP); Kazuhito Miyake, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/045,606

(22) Filed: Jan. 31, 2005

(65) Prior Publication Data

US 2005/0170155 A1 Aug. 4, 2005

(30) Foreign Application Priority Data

Jan. 29, 2004 (JP) ............................. 2004-022204

(51) Int. Cl.
*G03G 7/00* (2006.01)
*G01D 15/34* (2006.01)
*G01D 21/00* (2006.01)

(52) U.S. Cl. ........................................... 347/153; 399/9

(58) Field of Classification Search ............. 428/195.1; 430/124, 126; 369/126, 53.1, 99; 73/105, 73/104, 866; 347/129, 153; 399/9

See application file for complete search history.

(56) References Cited

U.S. PATENT DOCUMENTS 5,142,327 A * 8/1992 Kahle ......................... 399/160
5,837,345 A * 11/1998 Nishino et al. ............. 428/141
6,095,679 A * 8/2000 Hammiche et al. ........... 374/43
6,296,931 B1 * 10/2001 Azizi et al. ................. 428/340
6,312,788 B1 * 11/2001 Mohri et al. ............. 428/195.1
6,491,425 B1 * 12/2002 Hammiche et al. ........... 374/43
2003/0141487 A1 * 7/2003 Lelental et al. ............. 252/500
2003/0224192 A1 * 12/2003 Tani et al. .................. 428/485
2003/0234846 A1 * 12/2003 Koga et al. ................. 347/100
2004/0248028 A1 * 12/2004 Tamagawa et al. ......... 430/124
2005/0020448 A1 * 1/2005 Tamagawa et al. ......... 503/227

FOREIGN PATENT DOCUMENTS

| | | |
|---|---|---|
| JP | 10-239889 | 2/1997 |
| JP | 2000-131868 | 10/1998 |
| JP | 2000-181115 | 12/1998 |
| JP | 2002-341580 | 4/2001 |

* cited by examiner

*Primary Examiner*—Huan Tran
(74) *Attorney, Agent, or Firm*—Young & Thompson

(57) ABSTRACT

An image recording sheet used in electrophotographic imaging which comprises a paper sheet substrate coated with an image recording layer that takes on a probe penetration depth of 0.33 μm or greater for a change in prove temperature from 50° to 150° C. when measuring the probe penetration depth on a scanning type thermal microscope having a thermal probe operative as both heater and position sensor that is made of a Pt alloy containing 10% of Rh and has a cantilever spring constant of 1 N/m, a diameter of 6 μm and a curvature radius of 5 μm at an extreme end thereof under a condition that the thermal prove is changed in temperature at a programming rate of 15° C./sec within a programmed range of from a room temperature to 200° C. under a load (weight)+20 nA in 4-split T-B (Top-Bottom) value.

2 Claims, 3 Drawing Sheets

IMAGE RECORDING MEDIA AND IMAGE RECORDING METHOD

BACKGROUND OF THE INVENTION

1. Field of the Invention

The present invention relates to image recording media used in ink-jet printing, heat sensitive printing, thermal development printing, silver halide photographic printing and, in particular, printing, that prevents an occurrence of edge voids leading to uneven gloss recognized as an image defect, and a method of recording images on the image recording media.

2. Description of Related Art

Typically, image recording methods used in electrophotography have a problem with a deterioration in image quality resulting from an occurrence of edge voids (an image defect as uneven gloss resulting from lusterless boundaries between high density parts and white parts. There have been proposed a variety of approaches to solving the problem by governing viscoelasticity of a thermoplastic resin of an image receptor layer. For example, Japanese Unexamined Patent Publication No. 2002-341580 discloses an image printing or recording sheet comprising a paper sheet substrate and an image receptor layer coated on the paper sheet substrate at least one side thereof that contains a thermoplastic resin having a 10-points average surface roughness (Rz) in a range of from 0.1 to 3.0 mμ and a storage modulus (G') at 160° C. in a range of from $1\times10^3$ to $1\times10^6$ Pa. Japanese Unexamined Patent Publication No. 10-239889 discloses an image printing or recording sheet comprising a paper sheet substrate and a toner image receptor layer that is coated on the paper sheet substrate and has a storage modulus (G') and a loss modulus (G") both in a range of from $1\times10^2$ to $1\times10^5$ Pa, respectively, at a fixing temperature of toner. Japanese Unexamined Patent Publication No. 2000-131868 discloses an image receptor layer coated on a paper sheet substrate at either one or both sides thereof. A binding resin forming the image receptor layer has a storage modulus (G') of $1\times10^6$ Pa or higher at a temperature lower than 40° C. and satisfies the following conditions:

$$G'_{130}/G'_{200}\leqq 9.0 \text{ and } G'_{130}\leqq 1\times10^3 \text{ Pa.}$$

where $G'_{130}$ is the storage modulus at 130° C. and $G'_{200}$ is the storage modulus at 200° C.

Further, Japanese Unexamined Patent Publication No. 2000-181115 discloses an image printing or recording sheet comprising an image receptor layer that is coated on a paper sheet substrate at either one or both sides thereof and contains a binder resin having a storage modulus (G') of $1\times10^4$ Pa or higher at 130° C. and a storage modulus (G') of $1\times10^2$ Pa or higher at 200° C.

However, since viscoelasticity of thermoplastic resins of the conventional image receptor layers are measured at a programming rate (a rate of temperature-rise) of 2° to 10° C./min which is considerably low as compared with programming rates of practical toner fixing system such as comprising a fixing roller or a fixing belt that is generally in a range of from 10° to 100° C./sec, the measurements of viscoelasticity are not always in line with real quantitative deformation of the image receptor layers, technical improvement in viscoelasticity measurement is strongly desired.

SUMMARY OF THE INVENTION

It is therefore an object of the present invention to provide image printing or recording media used in ink-jet printing, heat sensitive printing, thermal development printing, printing, silver halide photographic printing, and the like which prevent an occurrence of edge voids leading to uneven gloss and, in consequence, produce high quality images thereon without defects such as uneven gloss.

It is another object of the present invention to provide a method of printing or recording high quality images on the media in printing.

According to an aspect of the present invention, an image recording medium or sheet used in an electrophotographic process which comprises a substrate coated with at least one image receiving layer taking on a probe penetration depth of 0.33 μm, more preferably 0.37 μm, or greater, for a change in probe temperature from 50° to 150° C. when measuring the probe penetration depth on a scanning type thermal microscope having a thermal probe operative as both heater and position sensor that is made of a Pt alloy containing 10% of Rh and has a cantilever spring constant of 1 N/m, a diameter of 6 μm and a curvature radius of 5 μm at an extreme end thereof under a condition that the thermal probe is changed in probe temperature from a room temperature to 200° C. at a programming rate of 15° C./sec under a load of +20 nA in 4-split T-B (Top-Bottom) value.

The substrate preferably comprises a base paper sheet coated with a polyolefin resin layer at either one or both sides thereof. The image recording layer preferably contains either one or both of a water-dispersant resin and a water-soluble resin. Furthermore, the image recording medium may further comprises a polymeric layer between the substrate and the image recording layer.

According to another aspect of the present invention, the image recording medium adapted suitable for printing preferably comprises a paper sheet substrate and at least one toner image receiving layer formed on the paper sheet substrate. A method of recording images on the image printing sheet comprises the steps of transferring a toner image on the image printing sheet, and heating, pressurizing, cooling and then separating the image printing sheet with the toner image transferred thereto using a belt fixing type smoothing machine equipped with heating and pressurizing means, a fixing belt and cooling means so as thereby to fix and smooth the toner image of the image printing sheet. In this instance, the fixing belt comprises a belt substrate and a surface layer of fluorocarbons siloxane rubber preferably having either one or both of a perfluoroalkyl ether group and a perfluoroalkyl group in a principal chain.

According to a still another aspect of the present invention, a qualification assessment method judges whether the image recording media coated with an image recording layer comprising at least one thermoplastic layer at either one or both sides side thereof is competent to form nondefective images thereon. Specifically, the image recording medium is judged to be competent to form nondefective images thereon on condition that the image recording layer takes on a probe penetrate depth of 0.33 μm, more preferably 0.37 μm, or greater, for a change in probe temperature from 50° to 150° C. when measuring the probe penetration depth on a scanning type thermal microscope having a thermal probe operative as both heater and position sensor that is made of a Pt alloy containing 10% of Rh and has a cantilever spring constant of 1 N/m, a diameter of 6 μm and a curvature radius of 5 μm at an extreme end thereof under the condition that the thermal probe is changed in temperature within a programmed temperature range of from a room temperature to 200° C. at a programming rate in a range of from 0.03° to 25° C./sec under a load of +20 nA in 4-split T-B (Top-Bottom) value.

The image recording media of the present invention comprises an image recording layer taking on a probe penetration depth of 0.33 μm or greater for a change in probe temperature from 50° to 150° C. when measuring the probe penetration depth on a scanning type thermal microscope having a thermal probe operative as both heater and position sensor that is made of a Pt alloy containing 10% of Rh and has a cantilever spring constant of 1 N/m, a diameter of 6 μm and a curvature radius of 5 μm at an extreme end thereof under the condition that the thermal probe is changed in temperature within a programmed temperature range of from a room temperature to 200° C. at a programming rate in a range of from 0.03° to 25° C./sec under a load of +20 nA in 4-split T-B (Top-Bottom) value. As a result, the image recording media do not produce edge voids even when it is subjected to a fixing process at a high programming rate, so as to be prevented from encountering uneven gloss which is assessed as an image defect and to be used suitably in ink-jet printing, heat sensitive printing, thermal development printing, silver halide photographic printing or, in particular, printing.

BRIEF DESCRIPTION OF THE DRAWINGS

The foregoing and other objects and features of the present invention will be clearly understood from the following detailed description when read with reference to the accompanying drawing, in which:

FIG. 1 is a schematic perspective view of a scanning type micro-thermal analyzer used in measuring deformation or a penetration depth that an image recording layer takes on;

DETAILED DESCRIPTION OF THE PREFERRED EMBODIMENTS

An image recording media of the present invention comprises a substrate and at least one image recording layer formed at one or both sides of the substrate paper sheet, and additional layers such as a polymer layer or other layers as appropriate. The image recording layer should take on a probe penetration depth of 0.33 μm, more preferably 0.37 μm, or greater, and most preferably in a range of from 0.4 to 0.7 μm, for a change in probe temperature from 50° C. to 150° C. The probe penetration depth is measured on a scanning type thermal microscope, otherwise known as a micro-thermal analyzer, having a thermal probe operative both as a heater and as a position sensor that is made of a Pt alloy containing 10% of Rh, having a cantilever spring constant of 1 N/m, a diameter of 6 μm, a probe tip having a curvature radius of 5 μm under the condition that the probe is changed in temperature within a programmed range of from a room temperature to 200° C. at a programming rate of 15° C./sec under a load of +20 nA in 4-split T-B (Top-Bottom) value.

If the probe penetration depth is less than 0.33 μm, the image recording layer is too hard to be sufficiently soften at a sharp programming rate during toner fixation, thereby possibly resulting in an occurrence of uneven gloss. In the case, for example, of an printing or recording sheet, air left between a fixing roller and the image recording layer (a toner image receiving layer) deforms the image recording layer and becomes hard to get out between them in consequence, so as thereby to grow to air spaces therebetween. These air spaces are crushed into the image recording layer by the fixing roller, forming dull indentations leading to uneven gloss which is one of causes defective images.

Figure 1:
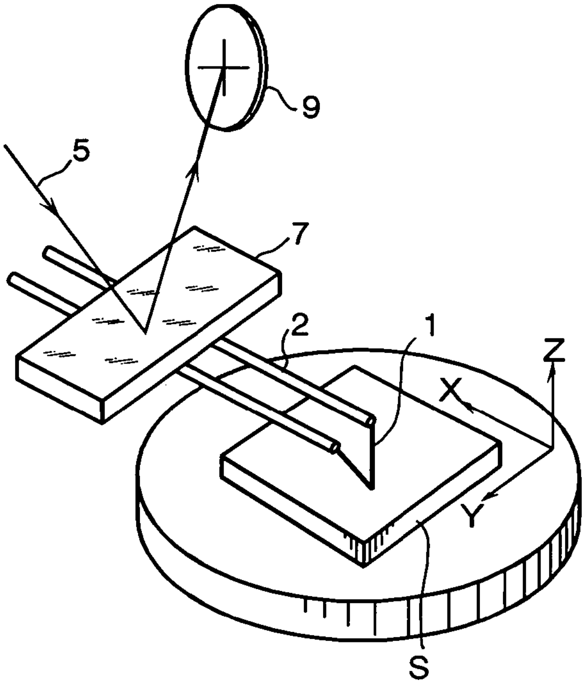

The micro-thermal analyzer is an atom force microscope (AFM) whose cantilever at its tip is combined with a sensor probe operative both as a heater and a temperature sensor. Specifically, as shown in FIG. 1, a thermal probe 1, that operates both as a heater and a position/temperature sensor, is fixedly attached to a cantilever of an atom fore microscope (not shown) through wires 2 and coupled with a reflective mirror 7. A fixed laser beam 5 incident upon and reflected by the reflective mirror 7 is detected by an optical position sensor 9. When passing an electric current through the thermal probe 1 fixed in a position aimed at, the thermal probe 1 rises in temperature and penetrates into a sample S when the sample S is softened due to glass transition and/or fusion. A change in vertical position of the thermal probe 1 is figured out by an output signal from the optical position sensor 7. A measured change in a vertical position of the thermal probe 1 represents a penetration depth of the sample S. In this instance, the probe temperature is found on the basis of a predetermined electrical resistance of the thermal probe 1.

There are various commercially available scanning type thermal microscopes such as a Micro-Thermal Analyzer, Model 2990 (T. A. Instrument Corporation) which is provided with a cantilever having a spring constant of 1 M/m and a thermal probe made of a Pt alloy containing 10% of Rh which has a diameter of 6 μm and a curvature radius of 5 μm at its tip.

Figure 2:
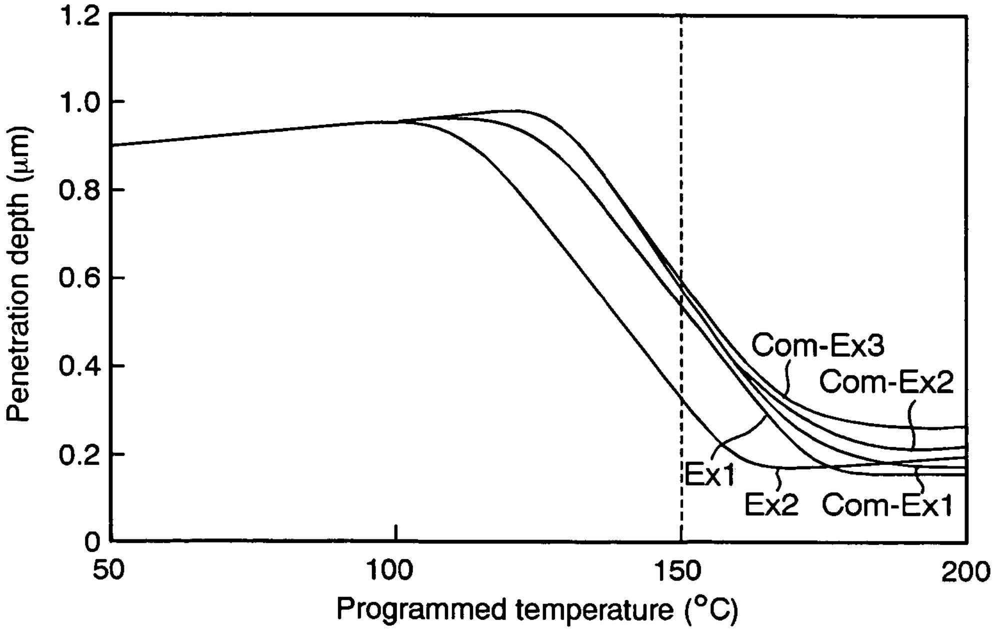
FIG. 2 is a graphical illustration showing a probe penetration depth relative to a probe temperature.

The penetration depth, for example, of an embodiment which will be described later is shown in FIG. 2. As shown, it is proved that the thermal probe starts to change in vertical position at a temperature in a range of from 100° to 130° C., this indicates that the thermal probe starts to penetrate into a sample image receptor layer at the temperature due to softening of the sample image receptor layer. The penetration depth is figured out and evaluated by a positional change when the temperature of the thermal probe is changed from 50° to 150° C. at a programming rate of 15° C./sec.

Conditions for controlling a probe penetration depth of 0.33 μm or greater of the image receptor layer include, but are not always completely bounded by, types of image recording media, more specifically, thermoplastic resins used for the image recording medium, a thickness of the image receptor layer (a spread of coating), a drying condition for a coating of the image receptor layer, plasticizing materials for the image receptor layer, and the like.

Although, as was previously mentioned, the image printing or recording media of the present invention are suitably used for any one of an imager recording sheet, a melting heat transfer recording sheet, a sublimation heat transfer recording sheet, a heat sensitive recording sheet, a silver halide photographic sheet and an ink-jet recording sheet, the following description will be directed to an image recording sheet by way of example.

An image recording sheet according to an embodiment of the present invention comprises a paper sheet substrate and at least one toner imager receiving layer formed at least one of opposite sides of the paper sheet substrate. The image recording sheet may further comprises a polymer layer and other layers, such as a surface protective layer, a cushioning layer, a static built-up control or antistatic layer, a reflection layer, a color tincture adjusting layer, a storage stability improvement layer, an anti-adhesion layer, an anti-curling layer, a smoothing layer, or the like as appropriate. These layers may be of a single later structure or of a multi-layer structure.

There are various paper available as the paper sheet substrate, e.g. base paper, synthetic paper, synthetic resin paper, coated paper, laminated paper, and the like. Among them, laminated paper coated with polyolefin resin layer on either or both sides thereof is preferable in light of smoothness glossiness and flexibility. The paper sheet substrate may be of a single layer structure or a multi-layer lamination structure.

Examples of the base papers include, but are not limited to, bond papers and papers listed described "Fundamentals of Photographic Engineering-Silver Salt Photography-" pages from 223 to 240, edited by Japanese Society of Photograph (1979, Corona Co., Ltd.). In order to create desired average surface roughness on a paper surface, it is preferred to use pulp fibers having such a distribution of fiber length as disclosed in, for example, Japanese Unexamined Patent Publication No.58-68037. Specifically, according to the publication, the distribution of fiber length is such that the pulp fibers contain a total part of residual pulp fibers screened with a 24-mesh screen and residual pulp fibers screened with a 42 mesh screen of 20 to 45% by mass and a part of residual pulp fibers screened with 24 mesh screen of less than 5% by mass. The base paper can be adjusted in average surface roughness by surface treatment with heat and pressure using a machine calender or a super calender.

Examples of materials for the base paper include, but are not limited to, natural pulp such as softwood or coniferous tree pulp, hardwood or broad leaf tree pulp, synthetic pulp made of synthetic resins such as polyethylene or polypropylene, or mixtures of natural pulp and synthetic pulp. Although it is preferred to use bleached broad leaf tree kraft pulp (LBKP) for the base paper in light of improving surface smoothness, rigidity and dimensional stability (curling property) all together to a sufficient and balanced level, it is allowed to use bleached coniferous tree kraft pulp (NBKP) or broad leaf sulphate pulp (LBSP). The pulp can be beaten to a pulp slurry (which is referred to as pulp stock in some cases) by, for example, a beater or a refiner. It is preferred that the pulp has a Canadian Standard Freeness of 200 to 440 ml, more preferably from 250 to 380 ml.

It is allowed to add various additives, e.g. fillers, dry strength stiffening agents, sizing agents, wet strength stiffening agents, fixing agents, pH adjusters and other chemical conditioners, to the pulp slurry according to need.

Examples of the fillers include calcium carbonate, clay, kaolin, white earths, talc, titanium oxides, diatom earths, barium sulfate, aluminum hydroxides, magnesium hydroxides, and the like. Examples of the dry strength stiffening agents include cationic starch, cationic polyacrylamide, anionic polyacrylamide, amphoteric polyacrylamide, carboxy-modified polyvinyl alcohol, and the like. Examples of the sizing agents include fatty acid salts, rosin, rosin derivatives such as maleic rosin, paraffin wax, alkylketene dimmers, alkenyl anhydrate succinic acids (ASA), compounds containing high fatty acids such as epoxidized fatty acid salts, or the like. Examples of the wet strength stiffening agents include polyamine polyamide epichlorohydrin, melamine resins, urea resins, epoxidized polyamide resins, and the like. Examples of the fixing agents include polyvalent metal salts such as aluminum sulfate or aluminum chloride, cationic polymers such as cationic starch, and the like. Examples of the pH adjusters include caustic soda, sodium carbonate, and the like. Examples of the additives include deforming agents, dyes, slime controlling agents, fluorescent brightening agents, and the like. In addition, it is allowed to add softening agents such as described in "New Handbook For Paper Processing" (1980, Paper Chemicals Times), pages 554 and 555 as appropriate.

Processing liquids that are used for a surface sizing process may contain water-soluble polymers, water-resisting agents, pigments, or the like. Examples of the water-soluble high molecular compounds include cationic starch, polyvinyl alcohol, carboxy-modified polyvinyl alcohol, acrboxymethyl cellulose, hydroxyethyl cellulose, cellulose sulfate, gelatin, casein, sodium polyacrylate, sodium salts of styrene-maleic anhydrate copolymers, polystyrene sulphonate sodium, and the like. Examples of the water-resisting agents include latex emulsions of styrene-butadiene copolymers, ethylene-vinyl acetate copolymers, polyethylene, vinylidene chloride copolymers, or the like, polyamide polyamine epichlorohydrin, and the like. Examples of the pigments include calcium carbonate, clay, kaolin, talc, barium sulfate, titanium oxides, and the like.

The base paper has a Young's modulus ratio of longitudinal Young's modulus (Ea) to transverse Young's modulus preferably in a range of from 1.5 to 2.0 in light of improving stiffness and dimensional stability (curling property) of the electrphographic image recording sheet. If the Young's modulus ratio (Ea/Eb) exceeds the lower limit of 1.5 or the upper limit of 2.0, the base paper is apt to cause deterioration in rigidity and/or curling property of the electrphographic image recording sheet which unpreferably causes the electrphographic image recording sheet to encounter aggravation of transfer quality.

Generally, it has been brought out that "stiffness" of paper varies depending upon beating processes. Elastic force or an elasticity modules that paper made after beating attains can be used as a key factor for defining a degree of paper stiffness. In particular, since a dynamic elasticity modules of paper that represents a solid state property of paper as a viscoelastic material is closely related to paper density, the dynamic elasticity modulus of paper is expressed in terms of an acoustic velocity through the paper that is measured by an ultrasonic transducer. Specifically, the elasticity modulus of paper is given by the following expression:

$$E=\rho c^2(1-n^2)$$

where E is the dynamic elasticity modulus;

ρ is the paper density;

c is the acoustic velocity through paper n is the Poisson's ratio.

Because the Poisson's ratio of ordinary paper is approximately 0.2, the dynamic elasticity modulus can be approximated by the following expression:

$$E=\rho c^2$$

That is, the elasticity modulus is easily obtained by substituting paper density and an acoustic velocity of paper for ρ and c in the above expression, respectively. An acoustic velocity of paper can be measured by an instrument well known in the art such as, for example, Sonic Tester, Model SST-110 (Nomura Co., Ltd.).

The base paper is not bounded by a thickness and, however, has a thickness preferably in a range of from 50 to 300 μm, more preferably in a range of from 100 to 250 μm. Further, the base paper is not bounded by a thickness and, however, has a basic weight preferably in a range of from 50 to 250 g/$m^2$ and more preferably in a range of from 100 to 200 g/$m^2$.

The synthetic paper is paper comprising polymeric fibers, other than cellulose, as a principal constituent. Examples of the polymeric fibers include polyolefin fibers such as polyethylene fibers, and polypropylene fibers.

The synthetic resin sheets or films are sheets made of synthetic resins. Examples of the synthetic resins sheets or films include polypropylene films, oriented polyethylene films, oriented polypropylene films, polyester films, oriented polyester films, nylon films, films tinged white due to orientation, white films containing white pigments, and the like.

The coated paper is a base paper coated with a layer of resin, rubber latex or high polymer at either one or both sides. The spread of coating is dependent upon intended applications of the coated paper. Examples of the coated paper include art paper, cast-coated paper, Yankee paper, and the like. It is preferred to use thermoplastic resins for the coating film. Examples of the thermoplastic resins are such as listed below.

(i) Polyolefin resins such as polyethylene resins or polypropylene resins; copolymers of olefin such as ethylene or propylene and other vinyl monomers; and acrylic resins.

(ii) Thermoplastic resins having ester linkages, examples of which include polyester resins obtained resulting from condensation of dicarboxylic acid components (which may be substituted with a sulfonic acid group or a carboxyl group) and alcohol components (which may be substituted with a hydroxyl group); polyacrylic ester resins or polymethacrylic ester resins such as polymethyle methacrylate, polybutyl methacrylate, polymethyle acrylate or polybutyl acrylate; polycarbonate resins; polyvinyl acetate resins styrene acrylic resins; styrene-methacrylic ester copolymer resins; vinyl toluene acrylic resins, and the like. More specific examples of the thermoplastic resins include those disclosed in, for example, Japanese Unexamined Patent Publication Nos. 59-101395, 60-294862, 63-7971, 63-7972 and 63-7973. Further, commercially available examples of the thermoplastic resins include, but are not limited to, Vyron 103, Vyron 200, Vyron 280, Vyron 290, Vyron 300, Vyron GK-130 and Vyron GK-140 (Toyobo Co., Ltd.); Tafuton NE-382, Tafuton U-5, Tafuton ATR-2009 and Tafuton ATR-2010 (Kao Co., Ltd.); Elitel UE3500, Elitel UE3210, Elitel XA-8153, Elitel KZA-7049 and Elitel KZA-1449 (Unitika Ltd.); Polyester TP-220 and Polyester R-188 (Nippon Synthetic Chemical Industry Co., Ltd.); and a Hyros series of thermoplastic resins (Seiko Chemical Industry Co., Ltd.).

(iii) Polyurethane resins.

(iv) Polyamide resins, urea resins, and the like.

(v) Polysulfone resins.

(vi) Polyvinyl chloride resins, polyvinyliden chloride resins, vinyl chloride-vinyl acetate copolymer resins, vinyl chloride-vinyl propionate copolymer resins.

(vii) Polyol resins such as polyvinyl butyral; and cellulose resins such as ethyl cellulose resins or cellulose acetate resin;

(viii) Polycaprolactone resins; styrene-maleic anhydride resins polyacrilonitrile resins; polyether resins; epoxy resins; and phenolic resins.

These thermoplastic resins may be used individually or in any combination of two or more. It is allowed for the thermoplastic resin to contain brightening agents, conducting materials, fillers and pigments or dyes such titanium oxides, ultramarine blue pigments and carbon black as appropriate.

The laminated paper is a sheet of base paper laminated with a polymeric sheer or film of various resins or rubber. Examples of laminating materials include polyolefin, polyvinyl chloride, polyethylene terephthalate, polystyrene, polymethacrylate, polycarbonate, polyimide, triacetylcellulose, and the like. which may be used individually or in any combination of two or more. Generally, the polyolefin is often made by utilizing low density polyethylene. However, in order for the paper sheet substrate to have an improved heat tolerance, it is desirable to use polypropylene, blends of polypropylene and polyethylene, high density polyethylene, blends of high density polyethylene and low density polyethylene, and the like. In particular, the blends of high density polyethylene and low density polyethylene are more preferable in light of cost and laminating adaptability. The blending ratio (weight ratio) of high density polyethylene to low density polyethylene is preferably in a range of from 1/9 to 9/1, more preferably in a range of from 2/8 to 8/2, and most preferably in a range of from 3/7 to 7/3. In the case where the paper sheet substrate is coated with a thermoplastic resin layer at its both sides, it is preferred to form a coating layer of high density polyethylene or a blend of high density polyethylene and low density polyethylene at the back side. In this instance, it is preferred for the polyethylene, high density or low density, to have a melt index in a range of from 1.0 to 40 g/10 minutes. These sheets or films may be blended with pigments such as titanium oxides or the like therein so as thereby to have white reflexivity.

The paper sheet substrate has a thickness preferably in a range of from 25 to 300 μm, more preferably in a range of from 50 to 260 μm, and most preferably in a range of from 75 to 220 μm. The paper sheet substrate has rigidity similar, but are not limited, to paper sheet substrates for silver salt color photography.

The polymeric layer is formed between the paper sheet substrate sheet and the toner image receiving layer. The polymeric layer has a thickness of 2 μm or greater, more preferably in a range of from 3 to 10 μm.

The polymeric layer preferably contain water-soluble polymers or water-dispersant polymers as a principal constituent. Among them, rubber type polymers are more preferred. The water-soluble polymers are not bounded by composition, bond-structure, molecular-geometry, molecular weight, molecular weight distribution, form, and the like. inasmuch as it is water-soluble. In order for the polymer to be water-soluble, the polymer has water-solubilization groups such as hydroxyl groups, carboxylic acid groups, amino groups, amid groups, ether groups, or the like. Examples of the water-soluble polymers include those disclosed in Research Disclosure Vol. 17, No. 643, page 26, Vol. 18, No. 716, page 651, and Vol. 307, No. 105, pages 873–874; and Japanese Unexamined Patent Publication No. 64-13546, pages 71–75. More specific examples of the water-soluble polymers include vinyl pyrrolidone acetate copolymers, styrene-vinyl pyrrolidone copolymers, styrene-maleic anhydride copolymers, water-soluble polyester, water-soluble acryl, water-soluble polyurethane, water-soluble nylon, water-soluble epoxy resins, polyvinyl alcohol (PVA), and the like. Examples of the water-dispersant polymers include acryl resin emulsions, polyvinyl acetate emulsions, styrene-butadiene-rubber (SBR) emulsions, polyester resin emulsions, polystyrene resin emulsions, urethane resin emulsions, and the like. These polymers may be may be used individually or in any combination of two or more. In the case of using gelatin, lime-treated gelatin, acid-treated gelatin, and what is called delimed gelatin that has a reduced calcium content can be selectively used.

The toner image receiving layer, that is a receptor to color toner or black toner, has the function of receiving a toner image from an intermediate transfer medium or a developing drum by the aid of static electricity or pressure in a transfer printing process and fixing the toner with heat or pressure in a fixing process. The toner image receiving layer contains at least as thermoplastic resins and, if necessary, other components. Examples of the thermoplastic resins include, but are not limited to, water-dispersant resins, water-soluble resins and other thermoplastic resins inasmuch as they are deformable at the fixing temperature.

It is preferred for the thermoplastic resins for the toner image receiving layer to be of an aqueous type such as water-soluble resin or water-dispersant for the following reasons (1) and (2):

(1) The aqueous type of resin spins off no organic solvent emissions in the coating and drying process and, in consequence, excels at environmental adaptability and handling properties.

(2) Release agents such as wax are hardly soluble in solvents at an ambient temperature in many instances and often required to be dispersed in solvents such as water or organic solvents prior to use. The water-dispersed form is better in light of stability and manufacturing process adaptability than the water-solved form. Further, water-coating causes wax to easily bleed onto a surface during a coating and drying process and, in consequence, brings out effects of the release agent such as offset and adhesion resistance properties.

The aqueous resins are not bounded by composition, bond-structure, molecular-geometry, molecular weight, molecular weight distribution, form, and the like. inasmuch as they are water-soluble or water-dispersant. Examples of the water-soluble resins include those disclosed in Research Disclosure Vol. 17, No. 643, page 26; Vol. 18, No. 716, page 651; Vol. 307, No. 105, pages 873–874; and Japanese Unexamined Patent Publication No. 64-13546, pages 71–75. More specific examples include vinyl pyrrolidone acetate copolymers, styrene-vinyl pyrrolidone copolymers, styrene-maleic anhydride copolymers, water-soluble polyester, water-soluble acryl, water-soluble polyurethane, water-soluble nylon and water-soluble epoxy resins. In the case of using gelatin, lime-treated gelatin, acid-treated gelatin and what is called delimed gelatin that has a reduced calcium content can be selectively used individually or in any combination of two or more. Commercially available examples of the water-soluble resins include various types of Pluscoat (Gao Chemical Industry Co., Ltd.), a Fintex ES series of polyester (Dainippon Ink & Chemical Inc.), both of which are of water-soluble polyester; Jurimar AT series of polyester (Nippon Fine Chemical Co., Ltd.), Fintex 6161 and K-96 (Dainippon Ink & Chemical Inc.), and Hyros NL-1189 and Hyros BH-997L (Seiko Chemical Industry Co., Ltd.), all of which are of water-soluble polyacrylates and/or polymethyacrylates. Examples of the water-dispersant resins include water-dispersant type resins such as water-dispersant acrylic resins, water-dispersant polyester resins, water-dispersant polystyrene resins, water-dispersant urethane resins, or the like; emulsions such as acryl resin emulsions, polyvinyl acetate emulsions, styrene-butadiene-rubber (SBR) emulsions, or the like; resins or emulsions comprising water-dispersant thermoplastic resins, copolymers of these resins and emulsions; mixtures of these resins and emulsions; and cation-modified products of these resins; and cation-modified products of these emulsions. These resins or emulsions may be used individually or in any combinations of two or more. Commercially available examples of the polyester type water-dispersant resins include Elitel UE3500, Elitel UE3210, Elitel XA-8153, Elitel KZA-1449, Elitel KZA-A464S, and Elitel KZA-A437S (Unitika Ltd.); Vyron 103, Vyron 200, Vyron 280, Vyron 290, Vyron 300, Vyron GK-130, and Vyron GK-140 (Toyobo Co., Ltd.); Tafuton NE-382, Tafuton U-5, Tafuton ATR-2009, and Tafuton ATR-2010 (Kao Co., Ltd.); Polyester TP-220, Polyester R-188, and Polyester HP-320 (Nippon Synthetic Chemical Industry Co., Ltd.); and the like. Commercially available examples of the acryl type water-dispersant resins include a Hyros XE series of water-dispersant resins, a Hyros KE series of water-dispersant resins, and a Hyros PE series of water-dispersant resins (Seiko Chemical Industry Co., Ltd.); and a Jurimar ET series of water-dispersant resins (Nippon Fine Chemical Co., Ltd.).

Specific examples of the other thermoplastic resins include: (i) polyurethane resins and the like; (ii) polyamide resins and the like; (iii) polysulfone resins and the like; (iv) polyvinylchloride resins and the like; (v) polyvinyl butyral and the like; (vi) polycaprolactone resins and the like; (vii) polyolefin resins and the like. Examples of (iv) the polyvinylchloride resins and the like include polyvinylden chloride resins, vinyl chloride-vinyl acetate copolymer resins, vinyl chloride-vinyl propionate copolymer resins and the like. Examples of (v) the polyvinyl butyral and the like include polyol resins, and cellulose resins such as ethyl cellulose resins, cellulose acetate resins or the like. It is preferred for the polyvinyl butyral to have a polyvinyl butyral content greater than 70% by mass and an average degree of polymerization higher than 500, more preferably higher than 1000. Commercially available examples of the polyvinyl butyral or he like include Denka Butyral 3000-1, Denka Butyral 4000-2, Denka Butyral 5000A, and Denka Butyral 6000C (Denki Kagaku Kogyo K.K.); and Esrex BL-1, Esrex BL-2, Esrex BL-3, Esrex BL-S, Esrex BX-L, Esrex BM-1, Esrex BM-2, Esrex BM-5, Esrex BM-S, Esrex BH-3, Esrex BX-1 and Esrex BX-7 (Sekisui Chemical Co., Ltd.). Examples of (vi) the polycaprolactone resin and the like include styrene-maleic anhydride resins, polyacrylonitrile resins, polyether resins, epoxy resins, phenol resins, and the like. Examples of (vii) the polyolefin resins and the like include polyethylene resins, polypropylene resins, copolymer resins of olefin such as ethylene or propylene and other vinyl monomers, acrylic resins, and the like. These thermoplastic resins may be used individually or in any combination of two or more.

The toner imager receiving layer has a thermoplastic resin content preferably greater than 50% by mass, more preferably in a range of from 50 to 90% by mass.

The toner imager receiving layer contain other components in addition to the thermoplastic resin. Examples of the other components include coloring agents such as pigments or dyes that are preferred in light of adjustment of whiteness of the toner image receiving layer, and various additives that are preferred for the purpose of improving thermodynamic properties. Examples of the other components include plasticizers, release or slide agents, matting agents, fillers, cross-linking agents, antistatic or static built-up control agents, emulsifying agents, dispersing agents and the like.

Example of the coloring agents include fluorescent brightening agents, white pigments, colored pigments, dyes, etc.

The fluorescent brightening agents are compounds having absorptive power in a near-ultraviolet range and produce fluorescence in a wavelength range of from 400 to 500 nm. There are a number of conventional fluorescent brightening agents can be used without particular restriction by type. Examples of the fluorescent brightening agents include compounds such as disclosed in "The Chemistry of Synthetic Dyes" by K. VeenRatarman, Vol. 8, Chapter 8. Specific examples of the compounds include stilbene compounds, coumarin compounds, biphenyl compounds, benzooxazoline compounds, naphthalimide compounds, pylazorine compounds, carbostyryl compounds. Commercially available examples of the fluorescent brightening agents include White Fulfa PSN, White Fulfa PHR, White Fulfa HCS, White Fulfa PCS and White Fulfa B (Sumitomo Chemical Co., Ltd.), and UVITEX-OB (Chiba-Geigy Ltd.).

Example of the white pigments include inorganic pigments such as titanium oxides, calcium carbonate or the like.

Examples of the colored pigments include various pigments disclosed in Japanese Unexamined Patent Publication No. 63-44653, azo pigments such as azo lake pigments (r.g. carmine 6B and red 2B), insoluble azo pigments (e.g. monoazo yellow, disazo yellow, pyrazolo orange and Balkan orange), or condensed azo pigments (e.g. chromophthal yellow and chromophthal red); polycyclic pigments such as phthalocyanine pigments (e.g. copper phthalocyanine blue and copper phthalocyanine green), dioxazine pigments (e.g. dioxazine violet), isoindolynone pigments (e.g. indolynone yellow), or slen pigments (e.g. perylene, perynon, flavantron and thioindigo); lake pigments (e.g. malachite green, rhodamine B, rhodamine G and Victoria blue B); and inorganic pigments such as oxides (e.g. titanium dioxides and colcothar), sulfate (e.g. precipitated barium sulfate), carbonate (e.g. precipitated calcium carbonate), silicate (e.g. hydrated silicate and anhydrous silicate) or metal powders (e.g. aluminum powders, bronze powders, blue powders, carbon black, chrom yellow and iron blue). The titanium oxides are the most preferable pigment among them. These pigments may be used individually or in any combinations of two or more. The pigments are not particularly bound by shape and, however, desirable to be in the form of hollow particles in light of predominant thermal conductivity (low thermal conductivity) during toner image fixation.

Various oil-soluble dyes or water-insoluble dyes that are conventionally used as coloring agents are utilized. Examples of the oil-soluble dyes include anthraquinone compounds, azo compounds and the like. Examples of the water-insoluble dyes include vat dyes such as C.I.Vat violet 1, C.I.Vat violet 2, C.I.Vat violet 9, C.I.Vat violet 13, C.I.Vat violet 21, C.I.Vat blue 1, C.I.Vat blue 3, C.I.Vat blue 4, C.I.Vat blue 6, C.I.Vat blue 14, C.I.Vat blue 20 or C.I.Vat blue 35; disperse dyes such as C.I. disperse violet 1, C.I. disperse violet 4, C.I. disperse violet 10, C.I. disperse blue 3, C.I. disperse blue 7 or C.I. disperse blue 58; and dyes such as C.I. solvent violet 13, C.I. solvent violet 14, C.I. solvent violet 21, C.I. solvent violet 27, C.I. solvent blue 11, C.I. solvent blue 12, C.I. solvent blue 25 or C.I. solvent blue 55. Colored couplers used for silver salt photography can be preferably utilized.

It is preferred for the toner image receiving layer (at the front side) to contain a coloring agent in a range of from 0.1 to 8 $g/cm^2$, more preferably in a range of from 0.5 to 5 $g/cm^2$. If the coloring agent content is less than the lower limit of 0.1 $g/cm^2$, the toner image receiving layer encounters an increased light transmittance. On the other hand, if the coloring agent content is beyond the upper limit of 8 $g/cm^2$, the toner image receiving layer is apt to become poor in tractability, in other words, to loose adhesion durability and toughness against cracks.

The release agents are blended in the toner image receiving layer for preventing an occurrence of offset of the toner image receiving layer. Various conventional plasticizing agents can be utilized without any particular restrictions as long as they precipitate out and distribute unevenly on a surface of the toner image receiving layer after fusion at a fixing temperature, and are cured in a shape of layer over the surface when cooled down.

Examples of the release or slide agents include silicon compounds, fluorine compounds, wax and matting agents. Preferred release agents among them include silicone oil, polyethylene wax, carnauba wax, silicone particles, and particles of polyethylene wax. Examples of the release agents include compounds disclosed in "Revised Edition: Property and Application of Wax" (Koushobou) and "Silicon Handbook" (Nikkan Kogyo Shinbun). It is also preferred to use silicone compounds, fluorine compounds or wax used for toner that are disclosed in Japanese Patent Nos. 2,838,498 and 2,949,558; Japanese Patent Publication Nos. 59-38581 and 4-32380; Japanese Unexamined Patent Publication Nos. 50-117433, 52-52640, 57-148755, 61-62056, 61-62057, 61-118760, 2-42451, 3-41465, 4-212175, 4-214570, 4-263267, 5-34966, 5-119514, 6-59502, 6-161150, 6-175396, 6-219040, 6-230600, 6-295093, 7-36210, 7-43940, 7-56387, 7-56390, 7-64335, 7-199681, 7-223362, 7-287413, 8-184992, 8-227180, 8-248671, 8-2487799, 8-248801, 8-278663, 9-152739, 9-160278, 9-185181, 9-319139, 9-319413, 10-20549, 10-48889, 10-198069, 10-207116, 11-2917, 11-449669, 11-65156, 11-73049 and 11-194542. These compounds can be used individually or in combination of two or more.

Examples of the silicone compounds include non-modified silicone oils, amino-modified silicone oils, carboxy-modified silicone oils, carbinol-modified silicone oils, vinyl-modified silicone oils, epoxy-modified silicone oils, polyether-modified silicone oils, silanol-modified silicone oils, methacryl-modified silicone oils, mercapto-modified silicone oils, alcohol-modified silicone oils, alkyl-modified silicone oils, fluorine-modified silicone oils, silicone rubber or silicone particulates, silicone-modified resins, reactive silicone compounds, and the like.

Commercially available examples of the non-modified silicone oils include dimethyl siloxyane oils, methyl hydrogen silicone oils and phenylmetyl silicone oils, more specifically, KF-96, KF-96L, KF-96H, KF-99, KF-50, KF-54, KF-56, KF-965, KF-968, KF-994, KF-995, HIVAC, and F-4, F-5 (Shinetsu Chemical Industry Co., Ltd.), SH200, SH203, SH490, SH510, SH550, SH710, SH704, SH705, SH7028A, SH7036, SM7060, SM7001, SM7706, SM7036, SH871107, and SH8627 (Toray Dow Corning Silicone Co., Ltd.), TSF400, TSF401, TSF404, TSF405, TSF431, TSF433, TSF434, TSF437, TSF450, TSF451, TSF456, TSF458, TSF483, TSF484, TSF4045, TSF4300, TSF4600, YF-33, YF-3057 YF-3800, YF-3802 YF-3804, YF-3807, YF-3897, XF-3905, XS69-A1753, TEX100, TEX101, TEX102, TEX103, TEX104, and TSW831 (Toshiba Silicone Co., Ltd.). Commercially available examples of the amino-modified silicone oils include KF-857, KF-858, KF-859, KF-861, KF-864, and KF-880 (Shinetsu Chemical Industry Co., Ltd.), SF8417 and SM8709 (Toray Dow Corning Silicone Co., Ltd.), and TSF4700, TSF4701, TSF4702, TSF4703, TSF4704, TSF4705, TSF4706, TEX150, TEX151, and TEX154 (Toshiba Silicone Co., Ltd.). Commercially available examples of the carboxy-modified silicone oils include BY-16-880 (Toray Dow Corning Silicone Co., Ltd.), and TFS4770 and XF42-A9248 (Toshiba Silicone Co., Ltd.). Commercially available examples of the carbinol-modified silicone oils include XF42-B0970 (Toshiba Silicone Co., Ltd.). Commercially available examples of the vinyl-modified silicone oils include XF40-A1987 (Toshiba Silicone Co., Ltd.). Commercially available examples of the epoxy-modified silicone oils include SF8411 and SF8413 (Toray Dow Corning Co., Ltd.), and TSF3965, TSF4730, TSF4732, XF42-A4439, XF42-A4438, XF42-A5041, XC96-A4462, XC96-A4463, XC96-A4464, and TEX170 (Toshiba SiliconeCo., Ltd.). Commercially available examples of the polyether-modified silicone oils include KF-351(A), KF-352(A), KF-353(A), KF-354 (A), KF-355(A), KF-615(A), KF-618, and KF-945(A) (Shinetsu Chemical Industry Co., Ltd.), SH3746, SH3771, SH8421, SH8419, SH8400, and SH8410 (Toray Dow Corning Silicone Co., Ltd.), and TSF4440, TSF4441, TSF4445, TSF4446, TSF4450, TSF4452, TSF4453, and TSF4460 (Toshiba Silicone Co., Ltd.). Commercially available examples of the an alcohol-modified silicone oils include SF8427 and SF8428 (Toray Dow Corning Silicone Co., Ltd.), and TSF4750, TSF4751, and XF42-B0970 (Toshiba Silicone Co., Ltd.). Commercially available examples of the alkyl-modified silicone oils include SF8416 (Toray Dow Corning Silicone Co., Ltd.), and TSF410, TSF411, TSF4420, TSF4421, TSF4422, TSF4450, XF42-334, XF42-A3160, and XF42-A3161 (Toshiba Silicone Co., Ltd.). Commercially available examples of the fluorine-modified silicone oils include SF1265 (Toray Dow Corning Silicone Co., Ltd.), and FQF502 (Toshiba Silicone Co., Ltd.). Commercially available examples of the silicone rubber or silicone particulates include SH851U, SH745U, SH55UA, SE4705U, SH502UA&B, SRX539U, SE6770-P, DY38-038, DY38-047, Trefil F-201, Trefil F-202, Trefil F-250, Trefil R-900, Trefil R902A, Trefil E-500, Trefil E-600, Trefil E-601, Trefil E-506, and Trefil BY29-119 (Toray Dow Corning Silicone Co., Ltd.), and Tospal 105, Tospal 120, Tospal 130, Tospal 145, Tospal 250, and Tospal 3120 (Toshiba Silicone Co., Ltd.). Commercially available examples of the silicone-modified resins include silicone-modified compounds of olefin resins, polyester resins, vinyl resins, polyamide resins, cellulose resins, phenoxy resins, vinyl chloride-vinyl acetate resins, urethane resins, acryl resins, styrene-acryl resins and copolymers of these resins, more specifically Dialoma SP203V, Dialoma SP712, Dialoma SP2105, and Dialoma SP2023 (Dainichiseika Color & Chemicals Mfg. Co., Ltd.), Modipa FS700, Modipa FS710, Modipa FS720, Modipa FS730, and Modipa FS770 (Nippon Oils & Fats Co., Ltd.), Saimack US-270, Saimack US-350, Saimack US-352, Saimack US-380, Saimack US-413, Saimack US-450, Rezeda GP-705, Rezeda GS-30, Rezeda GF-150, and Rezeda GF-300 (Toa Gosei Chemical Industry Co., Ltd.), SH997, SR2114, SH2104, SR2115, SR2202, DCI-2577, SR2317, SE4001U, SRX625B, SRX643, SRX439U, SRX488U, SH804, SH840, SR2107, and SR2115 (Toray Dow Corning Silicone Co., Ltd.), and YR3370, TSR1122, TSR102, TSR108, TSR116, TSR117, TSR125A, TSR127B, TSR144, TSR180, TSR187, YR47, YR3187, YR3224, YR3232, YR3270, YR3286, YR3340, YR3365, TEX152, TX153, TEX171, and TEX172 (Toshiba Silicone Co., Ltd.). Commercially available examples of the reactive silicone compounds include addition reaction type reactive silicone compounds, peroxide curing type reactive silicone compounds and ultraviolet curing type reactive silicone compounds, more specifically, TSR1500, TSR1510, TSR1511, TSR1515, TSR1520, YR3286, YR3340, PSA6574, TPR6500, TPR6501, TPR6600, TPR6702, TPR6604, TPR6701, TPR6705, TPR6707, TPR6708, TPR6710, TPR6712, TPR6721, TPR6722, UV9315, UV9425, UV9430, XS56-A2775, XS56-A2982, XS56-A3075, XS56-A3969, XS56-A5730, XS56-A8012, XS56-B1794, SL6100, SM3000, SM3030, SM3200 and YSR3022 (Toshiba Silicone Co., Ltd.).

Examples of the fluorine compounds include fluorine oils, fluorine rubber, fluorine-modified resins, fluorosulfonate compounds, fluorosulfonic acids, fluoride compounds or their salts, and inorganic fluoride. Commercially available examples of the fluorine oils include Dyfloyl #1, Dyfloyl #3, Dyfloyl #10, Dyfloyl #20, Dyfloyl #50, Dyfloyl #100, Unidyn TG-440, Unidyn TG-452, Unidyn TG-490, Unidyn TG-560, Unidyn TG-561, Unidyn TG-590, Unidyn TG-652, Unidyn TG-670U, Unidyn TG-991, Unidyn TG-999, Unidyn TG-3010, Unidyn TG-3020, and Unidyn TG-3510 (Daikin Kogyo Co., Ltd.), MF-100, MF-110, MF-120, MF-130, MF-160 and MF-160E (Tokem Products Co., Ltd.), Surflon S-111, Surflon S-112, Surflon S-113, Surflon S-121, Surflon S-131, Surflon S-132, Surflon S-141, and Surflon S-145 (Asahi Glass Co., Ltd.), and FC-430 and FC431 (Mitsui Phluoro Chemicals Co., Ltd.). Commercially available examples of the fluorine rubber include LS63U (Toray Dow Corning Silicone Co., Ltd.). Commercially available examples of the fluorine-modified resins include Modipa F200, Modipa F220, Modipa F600, Modipa F2020, and Modipa F3035 (Nippon Oils & Fats Co., Ltd.), Dialoma FF203, and Dialoma FF204 (Dainichiseika Color & Chemicals Mfg. Co., Ltd.), Surflon S-381, Surflon S-383, Surflon S-393, Surflon SC-101, Surflon SC-105, Surflon KH-40, and Surflon SA-100 (Asahi Glass Co., Ltd.), EF-351, EF-352, EF-801, EF-802, EF-601, TFE, TFEMA, and PDFOH (Tokem Products Co., Ltd.), and THV-200P (Sumitomo 3M Ltd.). Commercially available examples of the fluorosulfonate compounds include EF-101, EF-102, EF-103, EF-104, EF-105, EF-112, EF-121, EF122A, EF122B, EF-122C, EF-123A, EF-123B, EF-125M, EF-132, EF-135M, EF-305, FBSA, KFBS, and LFBS (Tokem Products Co., Ltd.). More specific examples of the fluoride compounds or their salts include anhydrous fluoric acids, dilute fluoric acids, fluorobolic acids, zinc fluorobolite, nickel fluorobolate, tin fluorobolite, lead fluorobolite, cupric fluorobolate, hydrofluosilicic acids, potassium titanate fluoride, perfluoro caprylic acids, perfluoro ammonium octanate. More specific examples of the inorganic fluoride include aluminium floride, potassium silicofluoride, potassium zirconate fluoride, zinc fluoride tetrahydrate, potassium fluoride, lithium fluoride, barium fluoride, tin fluoride, potassium fluoride, acidic potassium fluoride, magnesium fluoride, titanic fluorid, ammonium phosphate hexafluoride, potassium phosphate hexafluoride.

Examples of the wax include synthetic hydrocarbons, modified wax, hydrogenated wax, and natural wax. Commercially available examples of the synthetic wax include polyethylene wax, more specifically, Polyron A, Polyron 393 and Polyron H-481 (Chukyo Oils & Fats Co., Ltd.), and Sunwax E-310, Sunwax E-330, Sunwax E-250P, Sunwax LEL-250, Sunwax LEL-800 and Sunwax LEL-400P (Sanyo Chemical Industry Co. Ltd.); polypropylene wax, more specifically, Viscol 330-P, Viscol 550-P, and Viscol 660-P (Sanyo Chemical Industry Co., Ltd.); Fischer-Tropsch wax, more specifically, FT-100 and FT-0070 (Nippon Seiro Co., Ltd.); and acid amide compounds or acid imide compounds such as amide stearate or imide phthalic anhydride, more specifically, Serozole 920, Serozole B-495, Himicron G-270, Himicron G-110, and Hidrin D-757 (Chukyo Oils & Fats Co.).

Commercially available modified wax include amine-modified polypropylene, more specifically, QN-7700 (Sanyo Chemical Industry Co., Ltd.); acrylic acid-modified wax, fluorine-modified wax or olefin-modified wax; urethane type wax, more specifically, NPS-6010, and HAD-5090 (Nippon Seiro Co., Ltd.); and alcohol type wax, more specifically, NPS-9210, NPS-9215, OX-1949 and XO-020T (Nippon Seiro Co., Ltd.).

Commercially available examples of the hydrogenerated wax include hydrogenerated ricinus oils, more specifically, Castor Wax (Ito Oil Manufacturing Co., Ltd.); derivatives of ricinus oils, more specifically, dehydrated risinus oils DCO, DCO Z-1 and DCO-Z2, risinus oil fatty acid CO-FA, ricinoleic acids, dehydrated risinus oil fatty acids DCO-FA, dehydrated risinus oil fatty acid epoxyester D-4 ester, risinus oil type urethane acrylate CA-10, CA-20, and CA-30, derivatives of risinus oil MINERASOL S-74, MINERASOL S-80, MINERASOL S-203, MINERASOL S-42X, MINERASOL RC-17, MINERASOL RC-55, MINERASOL RC-335, special risinus oil condensed fatty acid MINERASOL RC-2, MINERASOL RC-17, MINERASOL RC-55, and MINERASOL RC-335, special risinus oil type condensed fatty acid ester MINERASOL LB-601, MINERASOL LB-603, MINERASOL LB-604, MINERASOL LB-7-2, MINERASOL LB-703, MINERASOL #11, and MINERASOL L164 (Ito Oil Manufacturing Co., Ltd.); stearic acids such as 12-hydroxystearic acids (Ito Oil Manufacturing Co., Ltd.); lauric acids; myristic acids; palmitic acids; behenic acids; sebacic acids such as sebacic acids (Ito Oil Manufacturing Co., Ltd.); undecylenic acids such as undecylenic acids (Ito Oil Manufacturing Co., Ltd.); heptyl acids such as heptyl acids (Ito Oil Manufacturing Co., Ltd.); maleic acids; higher maleic oils, more specifically, HIMALEIN DC-15, HIMALEIN LN-10, HIMALEIN OO-15, HIMALEIN DF-20, and HIMALEIN SF-20 (Ito Oil Manufacturing Co., Ltd.); blown oils, more specifically, Serbonol #10, Serbonol #30, Serbonol #60, Serbonol R-40, and Serbonol S-7 (Ito Oil Manufacturing Co., Ltd.); and cyclopentadiene oils, more specifically, CP Oil and CP Oil-S (Ito Oil Manufacturing Co., Ltd.).

Examples of the natural wax include vegetable wax, animal wax, mineral wax and petroleum wax. The vegetable wax is especially preferred among them. In light of compatibility in the case where an aqueous thermoplastic resin is used for the toner image receiving layer, it is more preferred to employ water-dispersant natural wax. The natural wax content of the toner image receiving layer (surface) is preferably in a range of from 0.1 to 4 $g/m^2$, more preferably in a range of from 0.2 to 2 $g/m^2$. If the natural wax content exceeds the lower limit of 0.1 $g/m^2$, the toner image receiving layer encounters significant deterioration in offset resistance and adhesion resistance. On the other hand, if the natural wax content exceeds the upper limit of 4 $g/m^2$, the wax content of the toner image receiving layer is too large to form images with acceptable qualities. The natural wax has a melting temperature preferably in a range of from 70° to 95° C., more preferably in a range of from 75° to 90° C., in light of, particular, offset resistance and transport qualities through equipments.

The matting agents are conventionally known in various types and any type of matting agents well known in the art can be utilized. Solid particles used for the matting agents are classified into two types, namely inorganic particles and organic particles. Examples of materials for the inorganic matting agents include oxides such as silica dioxides, titanium oxides, magnesium oxides, aluminum oxides and the like; alkaline earth metal salts such as barium sulfate, calcium carbonate, magnesium sulfate or the like; silver halides such as silver chloride, silver bromide, or the like; and glass. Examples of the inorganic matting agents include those disclose in West Germany patent No. 2,529,321, British patent Nos. 760775 and 1,260,772, U.S. Pat. Nos. 1,201,905, 2,192,241, 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245, and 4,029,504.

Examples of materials for the organic matting agents include starch, cellulose ester such as cellulose acetate propionate, cellulose ether such as ethyl cellulose, and synthetic resins. The synthetic resins are preferably water-insoluble or hardly water-soluble. Examples of the water-soluble or hardly water-soluble synthetic resins include poly(meth)acrylic ester such as polyalkyl acrylate, polyalkyl (meth)-acrylate, polyalkoxyalkyl(meth)acrylate or polyglycidyl (meth)acrylate; poly(meth)acrylamide; polyvinyl ester such as polyvinyl acetate; polyacrylo-nitrile; polyolefin such as polyethylene; polystyrene; benzoguanamine resins; formaldehyde condensed polymers; epoxy resins; polyamide; polycarbonate; phenol resins; polyvinyl carbazole; and polyvinyliden chloride. Copolymers comprising combinations of monomers used for the above mentioned polymers may be use. The copolymer may contain a small chain of hydrophilic repeating units. Examples of the monomers forming a hydrophilic repeating unit include acrylic acid, methacrylic acid, $\alpha$ $\beta$-unsaturated carboxylic acid, hydroxyalkyl (meth) acrylate, sulfoalkyl(meth)acrylate, and styrene sulfonate.

Examples of the organic matting agents includes those described in British Patent No. 1,055,713, U.S. Pat. Nos. 1,939,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,397, 3,754,924 and 3,767,448, and Japanese Unexamined Patent Publication Nos. 49-106821 and 57-14835. The organic matting agents may be used individually or in any combination of two or more. The organic matting agents has an average particle size preferably in a range of from 1 to 100 μm, more preferably in a range of from 4 to 30 μm. The amount of solid particles is preferably in a range of from 0.01 to 0.5 $g/cm^2$, more preferably in a range of from 0.02 to 0.3 $g/cm^2$.

The release agents that are added into the toner image receiving layer as appropriate may consist of derivatives, oxides or refined articles or mixtures of the various materials mentioned above. These materials may have reactive substituents. It is preferred to use the water-dispersant release agents in light of compatibility in the case where an aqueous thermoplastic resin is used for the toner image receiving layer.

The release agents has a melting temperature preferably in a range of from 70° to 95° C., more preferably in a range of from 75° to 90° C., in light of, in particular, offset resistance and transport qualities through equipments. The release agent content of the toner image receiving layer is preferably in a range of from 1 to 20% by mass, more preferably in a range of from 1 to 8.0% by mass, and most preferably in a range of from 1 to 5.0% by mass.

Various plasticizing agents used for conventional resins can be used without any particular restrictions. Such a plasticizing agent has the function of controlling fluidization or softening of the toner image receiving layer due to either heat or pressure applied in the toner fixing process. The plasticizing agents can be selected from those disclosed in “Handbook Of Chemistry” by Chemical Society of Japan (Maruzen), “Plasticizer-Theory and Applications—” by Kouichi Murai (Koushobou), “Study On Plasticizer Vol. 1”

and "Study On Plasticizer Vol. 2" both by Polymer Chemistry Association, or "Handbook Rubber Plastics Compounding Chemicals" (Rubber Digest Ltd.).

Examples of the plasticizing agents include those recited in Japanese Unexamined Patent Publication Nos. 59-83154, 59-178451, 59-178453, 59-178454, 59-178455, 59-178457, 61-2000538, 61-209444, 62-8145, 62-9348, 62-30247, 62-136646, 62-174754, 62-245253, and 2-235694. More specifically, Examples of the plasticizing agents recited in these publications include phthalate ester, phosphate ester, fatty ester, abietate, adipate easter, sebacate, azelate, benzonic ester, butyrate, epoxidized fatty ester, glycolate, propionate, trimellitate, citrate, sulfonate, calboxylate, succinate, maleate, phthalate or stearate, amide such as fatty amide or sulfoamide, ether, alcohol, lactone, polyethyleneoxy, and the like.

Polymers having comparatively low molecular weights can be used as the plasticizing agent. When using the polymers, it is preferred for the polymers to have molecular weights less than a binder resin that are to be plasticized. Specifically, the molecular weights of these polymers is preferably less than 15000, more preferably less than 5000. It is preferred for the polymeric plasticizing agents to be of the same type as a binder resin that is to be plasticized. For example, when plasticizing a polyester resin, it is preferred to use polyester having low molecular weights. It is also preferred to use oligomers as the plasticizing agent. Commercially available examples of the plastiizing agents other than the aforementioned compounds include Adecasizer PN-170 and Adecasizer PN-1430 (Asahi Denka Kogyo K.K.), PARAPLEX-G-25, PARAPLEX-G-30 and PARAPLEX-G-40 (C.P. HALL Corporation), and Estergum 8L-JA, Ester R-95, Pentaryn 4851, Pentaryn FK115, Pentaryn 4820, Pentaryn 830, Ruizol 28-JA, Picorastic A75, Picotex LC, and Crystalex 3085 (Rika Hercules Co., Ltd.).

It is possible to make arbitrary use of the plasticizing agent in order to reduce stress or strain (physical strain due to elastic force or viscosity, or strain due to mass balance of molecules, binder main chains and pendants) that occurs when toner particles are buried in the toner image receiving layer. The plasticizing agent may be present in a microscopically dispersed state, a microscopically phase separated state like a sea-island state, or a state where the plasticizing agent has mixed with and dissolved in other components such as a binder sufficiently, in the toner image receiving layer. The plasticizing agent may be utilized for the purpose of optimizing slide quality (improvement of transport quality due to a reduction in frictional force), and of improving offset quality (separation of a toner to a toner receptor medium), a curling balance and static build-up (formation of electrostatic toner image).

The plasticizer content of the toner image receiving layer is preferably in a range of from 0.001 to 90% by mass, more preferably in a range of from 0.1 to 60% by mass, and most preferably in a range of from 1 to 40% by mass.

There are two types of fillers as a component of the toner image receiving layer, namely organic fillers and inorganic fillers, that have been known as stiffeners, loading materials and reinforcing materials used for binder resins. The filler can be selected from those disclosed in "Handbook: Rubber•Plastics Composing Chemicals" (Rubber Digest Ltd.), "New Edition Plastic Composing Chemicals-Fundamentals And Applications" (Taiseisha), or "Filler Handbook" (Taiseisha).

Preferred examples of the inorganic fillers or pigments include silica, alumina, titanium dioxides, zinc oxides, zirconium oxides, iron oxides like mica, zinc white, lead oxides, cobalt oxides, strontium chromate, molybdenum pigments, smectite, magnesium oxides, calcium oxides, calcium carbonates, mullite, etc. Silica or alumina is particularly preferable as the filler among them. These fillers may be used individually or in combination of two or more. The filler preferably comprises particulates small in size. If the filler particle size is large, the toner image receiving layer is apt to become coarsely.

The silica, that my be globular or amorphous, can be synthesized in either a wet process, a dry process or an aerogel process. Surfaces of hydrophobic silica particles may be treated with a trimethylsilyl group or silicon. In this case, it is preferred to use colloidal silica particles. The silica particles has an average particle size preferably in a range of from 4 to 120 nm, more preferably in a range of from 4 to 90 nm. Further, it is preferred to use porous silica particles having an average particle size in a range of from 50 to 500 nm and an average pour volume per unit mass in a range of from 0.5 to 3 ml/g.

The alumina used for the filler may be anhydrous or hydrate, The anhydrous alumina may be of a crystal form of $\alpha$, $\beta$, $\gamma$, $\delta$, $\zeta$, $\eta$, $\theta$, $\kappa$, $\rho$ or $\chi$. The anhydrous alumina is preferably used rather than the alumina hydrate. Examples of the alumina hydrate include monohydrate such as pseudo-boemite, boemite or diaspore, and trihydrate such as gibbsite or bayerite. The alumina particles has an average particle size preferably in a range of from 4 to 300 nm, more preferably in a range of from 4 to 200 nm. Further, it is preferred to use porous alumina particles having an average particle size in a range of from 50 to 500 nm and an average pour volume per unit mass in a range of from 0.3 to 3 m/g. The alumina hydrate can be synthesized in either a sol-gel process in which alumina is precipitated by adding ammonia in a solution of alminium, or in a process of hydrolyzing an aluminate alkali. The anhydrous alumina can be derived by heating and dehydrating alumina hydrate.

The filler content of the image receiving layer is preferably in a range of from 5 to 2000 parts by dry mass relative to 100 parts by dry mass of a binder of the toner image receiving layer.

The crosslinking agents are added for the purpose of controlling storage stability and thermoplasticity of the toner image receiving layer. Compounds used for the crosslinking agents are those that have more than two reactive groups, such as an epoxy group, an isocyanate group, an aldehydo group, an active halogen group, an active methylene group, an acetylene group or other reactive groups conventionally well known, in one molecule. In addition, compounds that have more than two groups capable of forming an ionic bond, a hydrogen bond, or a coordinate bond.

Examples of the crosslinking agents include couplers, hardeners, polymerization initiators, polymerization promoters, coagulators, film forming agents, film forming auxiliary agents which are conventionally used for resins. Examples of the couplers include chlorosilane couplers, vinylsilane couplers, epoxysilane couplers, aminosilane couplers, alkoxy aluminum chelate couplers, titanate couplers, and couplers disclosed in "Handbook: Rubber•Plastics Composing Chemicals" (Rubber Digest Ltd.).

The static built-up control agents are added to the toner image receiving layer for the purpose of controlling toner transfer and adhesion properties and preventing toner image receiving layers from adhering to each other due to static built-up. The static built-up control agent is conventionally known in various types and may take any well known type. Examples of the static built-up control agents include surface-active agents such as cationic, anionic, amphoteric or nonionic surface-active agents, polyelectrolyte, and electrconductive metal oxides. More specific examples of the cationic static built-up control agents include, but are not limited to, quaternary ammonium salts, polyamine derivatives, cation-modified polymethyl methacrylate and cation-modified polystyrene. More specific examples of the anionic static built-up control agents include, but are not limited to, alkylphosphate and anion polymers. More specific examples nonionic static built-up control agents include, but are not limited to, fatty ester and polyethylene oxides. In the case where toner is charged with negative electricity, the static built-up agent to be added into the toner image receiving layer is preferred to be cationic or nonionic.

Examples of the electroconductive metal oxides include ZnO, $TiO_2$, $SnO_2$, $Al_2O_3$, $In_2O_3$, $SiO_2$, MgO, BaO, $MoO_3$, etc. These electroconductive metal oxides may be used individually or in the form of complex oxide of them and may further contain hetero elements. For example, ZnO may be doped with Al or In; $TiO_2$ may be doped with Nb or Ta; and $SnO_2$ may be doped with Sb, Nb or halogens.

It is preferred that the toner image receiving layer further contains various additives for the purpose of improving stability of an image formed on the image recording sheet or stability of the image receiving layer itself. Examples of the additives include conventionally known materials such as antioxidants, antidegeneration agents, age-registers, anti-degradation agents, antiozonant, ultraviolet absorption agents, metal complexes, light stabilizers, preservatives, or mildewproofing agents.

Examples of the antioxidants include chroman compounds, cumarin compounds, phenolic compounds such as hindered phenol compounds, hydroquinone derivatives, hindered amine derivatives, spiroindan compounds, and compounds disclosed in, for example, Japanese Unexamined Patent Publication No. 61-159644.

Examples of the age-resisters include those disclosed in "Handbook: Rubber•Plastics Composing Chemicals 2nd Revised Edition" (1993, Rubber Digest Ltd.), pages from 76 to 121.

Examples of the ultraviolet absorption agents include benzotriazole compounds such as disclosed in U.S. Pat. No. 3,533,794, 4-thiazolidine compounds such as disclosed in U.S. Pat. No. 3,352,681, benzophenone compounds such as disclosed in Japanese Unexamined Patent Publication No. 46-2784, and ultraviolet absorption polymers such as disclosed in Japanese Unexamined Patent Publication No. 62-260152.

Examples of the metal complexes include those disclosed in, for example, U.S. Pat. Nos. 4,241,155, 4,245,018 and 4,254,195, Japanese Unexamined Patent Publication Nos. 61-88256, 62-174741, 63-199428, 1-75568 and 1-74272.

Additives well known in the conventional photographic art can be used for the toner image receiving layer. Examples of the additives are disclosed in Research Disclosure Magazine Nos. 17643 (December 1987), 18716 (November 1979) and 307105 (November 1989) at the following pages:

| Additive | RD No. 17643 | RD No. 18716 | RD No. 307105 |
|---|---|---|---|
| Brightener | 24 | 648R | 868 |
| Stabilizer | 24–25 | 649R | 868–870 |
| Light Absorbent (UV Absorbent) | 25–26 | 649R | 873 |

-continued

| Additive | RD No. 17643 | RD No. 18716 | RD No. 307105 |
|---|---|---|---|
| Color Image Stabilizer | 25 | 650R | 872 |
| Film Hardener | 26 | 651L | 874–875 |
| Binder | 26 | 651L | 873–874 |
| Plasticizer/Lubricant | 27 | 650R | 876 |
| Coating Auxiliary (Surface-active agent) | 26–27 | 650R | 875–876 |
| Antistatic Agent | 27 | 650R | 976–977 |
| Matting Agent | | | 878–879 |

The toner image receiving layer has a thickness preferably in a range of from 1 to 50 μm, more preferably in a range of from 5 to 15 μm and a release strength preferably less than 0.1/25 mm, more preferably less than 0.041 N/25 mm, at a fixing temperature of 180 for toner image fixation when measured with respect to a surface material of a fixing member by the method meeting JIS K6887.

The toner image receiving layer has a high whiteness, specifically, higher than 85% when estimated by the method meeting JIS P8123. Further, the toner image receiving layer has a spectral reflection coefficient higher greater than 85% % either in a wavelength range of from 440 to 640 nm or in a wavelength range of from 400 to 700 nm and a difference between the highest and the lowest spectral reflection coefficients less than 5% in that wavelength range. More specifically, when specifying the degree of whiteness expressed in CIE 1976 (L*a*b*) color space, the toner image receiving layer has an L* value preferably greater than 80, more preferably greater than 85, and most preferably greater than 90. The white tincture is preferred as neutral as possible and, in other words, has a value $((a^*)^2+(b^*)^2)$ expressed in CIE 1976 (L*a*b*) color space preferably less than 50, more preferably less than 18, and most preferably less than 5. Furthermore, the toner image receiving layer has glossiness, specifically 45° glossiness, preferably greater than 60, more preferably greater than 75, and most preferably greater than 90, in an entire range from a white state which refers to a state where no toner is applied to the toner image receiving layer to a black state which refers a state where toner is applied to the toner image receiving layer at the highest density. However, it is essential that the toner image receiving layer has the highest 45° glossiness preferably less than 110. This is because, if the 45° glossiness is beyond 110, the toner image receiving layer takes on metallic luster which produce undesirable image qualities. The glossiness of toner image receiving layer can be measured by the method meeting JIS Z8741.

It is preferred that the toner image receiving layer satisfies at least one, preferably two or more, more preferably all, of the following solid state properties (1) to (5):

(1) The toner image receiving layer has a temperature for attaining its own viscosity of $1\times10^5$ CP higher than 40° C. but lower than that of toner (2) The toner image receiving layer has a storage elastic modulus (G') at a fixing temperature in a range of from $1\times10^2$ to $1\times10^5$ Pa and a loss elastic modulus (G") at the fixing temperature in a range of from $1\times10^2$ to $1\times10^5$ Pa (3) The toner image receiving layer has a loss tangent (G"/G') at the fixing temperature, which represents a ration of loss elastic modulus (G") relative to storage elastic modulus (G'), in a range of from 0.01 to 10

(4) The toner image receiving layer has a storage elastic modulus (G') at a fixing temperature is in a range of from −50 Pa to +2500 Pa from the storage elastic modulus (G't) of toner at a fixing temperature (5) An angle of inclination of molten toner with respect to the toner image receiving layer is preferably less than 50°, and more preferably less than 40°.

Furthermore, it is preferred for the toner image receiving layer to satisfy the solid state properties disclosed in U.S. Pat. No. 2,788,358, Japanese Unexamined Patent publication Nos. 7-248637, 8-305067 or 10-239889.

It is preferred that the toner image receiving layer has a surface electrical resistivity in a range of from $1\times10^6$ to $1\times10^{15}$ Ω/cm$^2$ under the condition of a temperature of 25° C. and a relative humidity of 65%. If the lower limit electrical resistivity of $1\times10^6$ Ω/cm$^2$ is exceeded, this indicates that the amount of toner transferred to the toner image receiving layer is insufficient, then a toner image is apt to diminish in density. On the other hand, if the upper limit electrical resistivity of $1\times10^{15}$ Ω/cm$^2$ is exceeded, electrical charges are generated too much to transfer a sufficient amount of toner to the toner image receiving layer. This excessive charges results in a low density of toner image, adhesion of dust due to elastic built-up during handling the elctrophotographic image recording sheet, miss-feed of the elctrophotographic image recording sheet during copying, double feed of two or more elctrophotographic image recording sheets, generation of charge prints and an occurrence of fractional absence of toner transfer.

In this instance, it is preferred that the paper sheet substrate sheet at a surface opposite to the toner image receiving layer has a surface electrical resistivity preferably in a range of from $5\times10^8$ to $3.2\times10^{10}$ Ω/cm$^2$, and more preferably in a range of from $1\times10^9$ to $1\times10^{10}$ Ω/cm$^2$. The surface electrical resistivity can be measured by the method meeting JIS K 6911 using a measuring device such as Model R8340 (Advantest Co., Ltd.). Specifically, the surface electrical resistivity is measured under the condition of a temperature of 20° C. and humidity of 65% after a lapse of one minute from impression of a voltage of 100V on a sample sheet that has been moisturizing for more than eight hours under the same conditions.

As was previously mentioned, the image recording sheet may be provided with other layers such as a surface protective layer, a backing layer, a contact improvement layer, an under coating layer, a cushioning layer, a static built-up control or antistatic layer, a reflection layer, a color tincture control layer, a storage stability improvement layer, an anti-adhesion layer, an anti-curling layer or a smoothing layer. These layers may be formed individually or in any combination of two or more.

The surface protective layer, that may be of a single-layered structure or a multi-layered structure, is formed over the toner image receiving layer for the purpose of protecting a surface thereof, improving storage stability, handling adaptability and transport quality through equipments, and providing writing adaptability and anti-offset properties. Thermoplastic resin binders or thermosetting resin binders can be used for the surface protective layer. In this instance, it is preferred to use the same resin binder as used for the toner image receiving layer. The binders for the surface protective layer may not always be the same in thermo dynamic and electrostatic characteristics as those of the toner image receiving layer and can be optimized so as to meet the surface protective layer.

The surface protective layer may be blended with additives that are usable for the toner image receiving layer such as, in particular, matting agents as well as the release agents described in connection with the image recording sheet.

It is preferred that the outermost layer of the electrophotoelectric image recording sheet (e.g. the surface protective payer when provided) has high compatibility with toner in light of fixing performance. Specifically, it is preferred that the outermost layer has a contact angle with molten toner in a range of from 0 to 40°.

The backing layer is formed on a surface of the paper sheet substrate sheet opposite to the toner image receiving layer for the purpose of providing back side image output adaptability and improving back side output image qualities, curling balance and transport qualities through equipments. Although the backing layer is not always bound by color, nevertheless, it is preferred for the backing layer to be white in the case where the image recording sheet is of two-sided. It is preferred that the backing layer has whiteness and a spectral reflecting coefficient both higher than 85% similarly to the toner image receiving layer. In order to improve double-sided image output adaptability of the image recording sheet, the backing layer may be constituently the same as the toner image receiving layer and may be of a single-layered structure or a multi-layered structure. Furthermore, the backing layer may be blended with additives such as, in particular, matting agents and the static built-up control agents previously described. In the case of using a release oil for fixing rollers, it is preferred that the backing layer is of an oil absorbing type.

The contact improvement layer is provided preferably for the purpose of improving contact between the toner image receiving layer and the paper sheet substrate sheet. The contact improvement layer may be blended with various additives, including in particular the crosslinking agents, that were previously described. Furthermore, it is preferred for the electrophotogreaphic image recording sheet to have a cushioning layer between the contact improvement layer and the toner image receiving layer for the purpose of improving toner acceptability.

The following description is directed to toner for use with the image recording sheet. Images are printed or copied on the electrophptogreaphic image recording sheet by accepting toner by the toner image receiving layer. The toner contains at least binding resins, coloring agents and, if needed, release agents.

Examples of the binding resins include styrene such as styrene or parachlorosthylene; vinyl ester such as vinyl naphthalene, vinyl chloride, vinyl bromide, vinyl fluoride, vinyl acetate, vinyl propionate, vinyl benzoate or vinyl butarate; methylene aliphatic series of carboxylate ester such as methyl acrylate, ethyl acrylate, n-butyl acrylate, isobutyl acrylate, dodecyl acrylate, n-octyl acrylate, 2-chloroethyl acrylate, phenyl acrylate, methyl α-chloroacrylate, methyl methacrylate, ethyl methacrylate or butyl methacrylate; vinyl nitrile such as acrylonitrile, methacrylonitrile or acrylamide; vinyl ether such as vinyl methyl ether, vinyl ethyl ether or vinyl isobutyl ether; N-vinyl compounds such as N-vinyl pyrrole, N-vinyl carbazole, N-vinyl indole or N-vinyl pyrrolidone; homopolymers or copolymers of vinyl monomers such as vinyl carboxylate such as methacrylic acid, acrylic acid or cinnamic acid; and various polyester. These binding resins may be used in combination with various wax. It is preferred to use the same type of resin as used for the toner image receiving layer.

Coloring agents used for ordinary toner can be used without any restrictions. Examples of the coloring agents include various pigments such as carbon black, chrome yellow, Hansa yellow, benzidine yellow, slen yellow, quinoline yellow, permanent orange GTR, pyrazolone orange, Vulcan orange, Watchung red, permanent red, brilliant carmine 3B, brilliant carmine 6B, Deipon oil red, pyrazalone red, redole red, rhodamine B lake, lake red C, rose Bengal, aniline blue, ultramarine blue, Carco oil blue, methylene blue chloride, phthalocyanine blue, phthalocyanine green or malachite green oxalate; and various dyes such as acridine dyes, xanthene dyes, azoic dyes, benzoquinone dyes, axine dyes, anthraquinone dyes, thioindigo dyes, dioxazine dyes, thiazine dyes, azomethine dyes, indigo dyes, thioindigo dyes, phthalocyanine dyes, aniline black dyes, polymethine dyes, triphenylmethane dyes, diphenylmethane dyes, thiazine dyes, thiazole dyes or xanthene dyes. These pigments or dyes may be used individually or in any combination of two or more.

It is preferred that the coloring agent content is in a range of from 2 to 8% by mass. The toner does not lose tinctorial power when the coloring agent content is higher than 2% by mass nor lose transparency when the coloring agent content is less than 8% by mass.

Although all types of wax conventionally known in the art can be used as the release agents in principle, preferred examples of the release agents that are good for the toner include higher crystalline polyethylene wax having comparatively low molecular weights, Fischer-Tropsch wax, amide wax and polar wax containing nitrogen such as urethane compound. It is preferred to use polyethylene wax having a molecular weight less than 1000, and more preferably in a range of from 300 to 1000.

It is preferred to use compounds having urethane bonds because such a compound keeps itself solid due to coagulation power of its polar group even though it has only a small molecular weight and can be set to a higher melting temperature with respect to a low molecular weight. It is preferred that the compounds have molecular weights in a range of from 300 to 1000. Examples of raw materials for the compounds include combinations of diisocyanate compounds and monoalcohol, combinations of monoisocyanate and monoalcohol, combinations of dialcohol and monoisocyanate, combinations of trialcohol and mono-isocyanate, combinations of triisocyanate and monoalcohol, and the like. In order to keep the compound from having a higher molecular weight, it is preferred to combine compounds of a multifunctional groups and a monofunctional group and is important for the compound to have quantitatively equivalent functional groups.

Specific example of the monoisocyanate compounds as a source compound include dodecyl isocyanate, phenyl isocyanate, derivatives of phenyl isocyanate, naphthyl isocyanate, hexyl isocyanate, benzyl isocyanate, butyl isocyanate, aryl isocyanate, and the like. Specific example of the diisocyanate compounds as a source compound include tolylene diisocyanate, 4, 4' diphenyl methane diisocyanate, toluene diisocyanate, 1,3-phenylene diisocyanate, hexamethylene diisocyanate, 4-methyl-m- phenylene diisocyanate, isophorone diisocyanate, and the like. Specific example of the monoalcohol include very general alcohol such as methanol, ethanol, propanol, butanol, pentanol, hexanol, heptanol or other general alcohol. Specific example of the dialcohol include, but are not bounded by, various glycol such as ethylene glycol, diethylene glycol, triethylene glycol, trimethylene glycol or the like. Further, specific examples of the trialcohol include, but are not limited to, trimethylol propane, triethylol propane, trimethanol ethane and the like.

These urethane compounds may be blended with the toner together with a resin and a coloring agent, like ordinary release agents, so as to provide a kneaded type of toner. When using the urethane compounds for preparing toner in an emulsion polymerization-coagulation melting method, a dispersion liquid of release agent particulates is prepared by dispersing the urethane compound in water together with an ionic surface-active agent and polyelectrolyte such as a polymer acid or a polymer base, heating it to a temperature higher than its melting temperature and strongly shearing the particulates to sizes less than 1 μm using a homogenizer or a pressure discharge dispersion machine. The dispersion liquid can be blended with the toner together with a dispersant liquid of resin particulates and a dispersant liquid of coloring agent particulates. The release agent content of the toner is preferably in a range of from 1 to 20% by mass, more preferably in a range of from 1 to 10% by mass.

The toner may be blended with other components such as internal additives, static built-up control agents, inorganic particulates, or the like. Examples of the internal additives include various magnetic materials such as metals, specifically, ferrite, magnetite, reduced iron, cobalt, nickel, manganese, alloys or compounds containing these metals.

Examples of the static built-up control agents include dye such as quaternary ammonium salt compounds or nigrosin compounds, complexes of aluminum, iron or chrome, and various triphenylmethane pigments ordinarily used as static built-up control agents. In light of controlling ionic strength having an effect on stability of the toner during coagulation and melting and of reducing wastewater pollution, it is preferred to use a static built-up control agent that is hardly dissolved in water.

Examples of the inorganic particulates include all of the conventional external additives that are applied to surfaces of toner particles such as silica, alumina, titania, calcium carbonate, magnesium carbonate, tricalcium phosphate, or the like. It is preferred to use the inorganic particulates in the form of a dispersion with ionic surface-active agents, polymer acids or polymer bases.

Surface-active agents may be used for the purpose of emulsion polymerization, seed polymerization, dispersing pigments, resin particles or release agents, coagulation, and their stabilization. It is effective to use anion surface-active agents such as sulfate salt surface-active agents, sulfonate surface-active agents, phosphate surface-active agents or soap surface-active agents; cationic surface-active agents such as amine salt surface-active agents or quaternary ammonium salt surface-active agents; or nonionic surface-active agents such as polyethylene glycol surface-active agents, surface-active agents of alkylphenol ethylene oxide adducts or polyhydric alcohol surface-active agents. In order to disperse these internal additives, it is possible to use popular dispersing machines such as a rotary shearing type of homogenizer, ball mills or sand mills.

The toner may further be blended with external additives such as inorganic particles or organic particles if needed. Examples of the inorganic particles include particles of $SiO_2$, $TiO_2$, $Al_2O_3$, CuO, ZnO, $SnO_2$, $Fe_2O_3$, MgO, BaO, CaO, $K_2O$, $NaO_2$, $ZrO_2$, $CaO.SiO_2$, $K_2O.(TiO_2)_n$, $Al_2O_3.2SiO_2$, $CaCO_3$, $MgCO_3$, $BaSO_4$ or $MgSO_4$. Examples of the organic particles include powders of fatty acids, their derivatives or their metallic salts, and resin powders of fluorocarbon resins, polyethylene resins or acryl resins. It is preferred that these powders have an average particle size in a range of from 0.01 to 5 μm, and more preferably in a range of from 0.1 to 2 μm.

Although various methods may be used to manufacture the toner without specific restrictions, it is preferred to employ methods including the following processes (i) to (iii):

(i) A process of preparing a dispersion liquid of coagulated resin particles by coagulating resin particles in a dispersion liquid.

(ii) A process of adhering the coagulated resin particles with particulates by mixing a dispersion liquid of the particulates with the dispersion liquid of coagulated resin particles.

(iii) A process of forming toner particles by heating and fusing the coagulated particle and the adhered particulates together.

It is preferred that the toner has a volumetric average particle size preferably in a range of from 0.5 to 10 μm. If the volumetric average particle size exceeds the lower limit of 0.5 μm., the toner has adverse effects on its handling properties (supply and cleaning convenience, and fluidity) and encounters aggravation of productivity. On the other hand, if the volumetric average particle size exceeds the upper limit o 10 μm, the toner has an adverse effect on image quality and resolution due to graininess and transferability. Furthermore, it is preferred that the toner to have a volumetric average grain size distribution index (GSDv) less than 1.3 and a ratio (GSDv)/GSDn) of a volumetric average grain size distribution index (GSDv) relative to a number average grain size distribution index (GSDn) equal to or greater than 0.9 while satisfying the volumetric average particle size in the above specified range. In addition, it is preferred that the toner has an average form factor expressed in terms of the equation as below, while satisfying the volumetric average particle size in the above specified range.

$$\text{Form factor}=(\pi\times L^2)/(4\times S)$$

where L is the greatest size of toner particle and S is the projected area of toner particle.

When the toner satisfies the requirements as set forth above, the toner has an positive effect on image qualities, in particular graininess and resolution, prevents an occurrence of fractional absence of toner transfer and/or an occurrence of blurring of a tone image, and is hardly apt to encounter aggravation of handling properties even though the average particle size is insufficiently small.

It is further preferred that the toner has its own storage elastic modulus (G') at a temperature of 150° C., that measured with an angular frequency of 10 rad/sec, in a range of from 10 to 200 Pa in light of improving image qualities and preventing an occurrence of offset in the fixing process.

The following description will be directed to a method of recording images on the image recording sheet according to an embodiment of the present invention. The image recording method comprises a toner image recording step and toner image fixing and smoothing step. In the toner image recording step, a toner image is transferred onto the image recording sheet of the present invention. The toner image recording step is known in various forms and may take any form without any restrictions as long as it can form an toner image on the image recording sheet. Examples of the toner image recording step include ordinary image recording processes such as a direct transfer process in which a toner image on a developing roller is directly transferred to an sheet or an intermediate belt-transfer process in which a toner image is transferred to an sheet after an intermediate transfer of the toner image onto a transfer belt. It is preferred to employ the intermediate belt-transfer process in light of environmental stability and high image qualities.

In the toner image fixing and smoothing step, the image recording sheet with an toner image transferred thereonto is heated, pressurized cooled and then separated away using a belt fixing type smoothing machine equipped with a toner image fixing belt, heating and pressurizing means, and a cooling device. A cooling and separating region, and other means if necessary, may be incorporated in the fixing and smoothing machine. The heating and pressurizing means, that is not bounded by types or structures, may comprise a pair of heating rollers or a combination of a heating roller and a pressure roller. The cooling device is known in various forms such as a heatsink and may take any type well known in the art without any restrictions as long as it is capable of blowing air and adjusting a cooling temperature. The cooling and separating region as used herein shall mean and refer, but not limited, to a location near a tension roller where the image recording sheet separates away from the fixing belt with its own stiffness.

When bringing the image recording sheet into contact with the heating and pressing means, it is preferred to apply pressure to the image recording sheet. Although there is no particular limit to a pressure application manner, it is preferred to apply nip pressure preferably in a range of from 0.098 to 9.8 MPa or from 1 to 100 $kgf/cm^2$, and more preferably in a range of from 0.49 to 2.95 MPa or from 5 to 30 $kgf/cm^2$, to the image recording sheet in light of formation of images having water resistance, distinguished surface smoothness and satisfactory gloss. Furthermore, it is preferred that the heating and pressurizing means heats the image recording sheet at a temperature higher than a softening temperature of a thermoplastic resin of the toner image receiving layer that is preferably in a range of from 80 to 200° C. although depending on types of thermoplastic resins and that the cooling device cools down the image recording sheet at a temperature lower than 80° C. that is sufficiently low to cure a thermoplastic resin of the toner image receiving layer, more preferably at a temperature in a range of from 20 to 80° C.

The fixing belt comprises a heat-resistant film substrate and a releasing layer formed on the heat-resistant film substrate film. The fixing belt is known in various structures and may take any structure well known in the art as long as it has good heat resistance. Examples of the film substrate include films of polyimide (PI), polyethylene naphthalate (PEN), polyethylene telephthalate (PET), polyether ether ketone (PEEK), polyether sulfone (PES), polyether imide (PEI) or polyparabanic acids (PPA). It is preferred to use a releasing layer formed from at least one selected from a group consisting of silicon rubber, fluorine rubber, fluorocarbon siloxane rubber, silicon resins and fluorine resins for the releasing layer. Among them, it is preferred to form a fluorocarbon siloxane rubber layer on one surface of the fixing belt or to form a silicon rubber layer over a fluorocarbon siloxane rubber layer formed on a silicon rubber layer.

Examples of the fluorocarbon siloxane rubber include those having at least either one of a perfluoroalkyl ether group and a perfluoroalkyl group in a principal chain. Furthermore, it is preferred to use hardened compositions of fluorocarbon siloxane rubber containing the following components (A) to (D):

(A) Fluorocarbone polymers composed of fluorocarbon siloxane as a principal constituent expressed by the general formula (1) as described below and having aliphatic unsaturated groups.

(B) Organopolysiloxane and/or fluorocarbon siloxane which have two or more $\equiv$SiH groups in one molecule and contains $\equiv$SiH groups one to four times by molar quantity relative to aliphatic unsaturated groups contained in the fluorocarbon siloxane rubber composition.

(C) Filler.

(D) Effective quantity of catalyst.

The fluorocarbon polymers as the component (A) are such as to comprise fluorocarbon siloxane as a principal constituent that has recurring units expressed by the following general formula (1), and aliphatic unsaturated groups.

Examples of the organopolysiloxane having $\equiv$SiH groups as the component (B) include organohydrogen polysiloxane having at least two hydrogen atoms bonded to silicon atoms in one molecule.

In the case where the component (A) is a fluorocarbone polymer having aliphatic unsaturated hydrocarbon groups, it is preferred to use hardening agents such as organohydrogen polysiloxane as a hardening agent for the fluorocarbon siloxane rubber composition mentioned above. That is, the hardened composition is produced through an addition reaction between the aliphatic unsaturated hydrocarbon groups in the fluorocarbon siloxane and the hydrogen atoms bonded to silicon atoms in the organohydrogen polysiloxane. Various organohydrogen polysiloxane conventionally used to produce an addition hardening type of silicon rubber composition can be used. It is preferred that the organohydrogen polysiloxane is blended so as to contain at least one, (1)

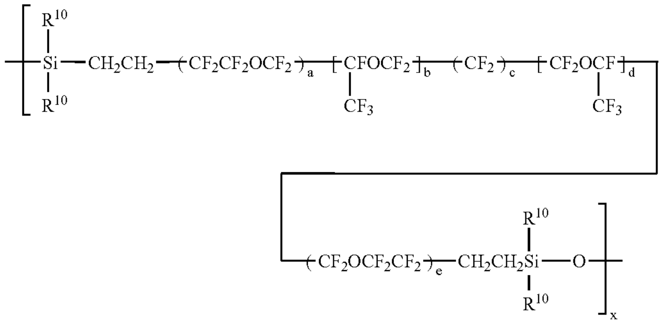

In the general formula (1), $R^{10}$ represents a substitutable or a non-substitutable univalent hydrocarbon group having a carbon number between 1 and 8 and is preferably an alkyl group having a carbon number between 1 and 8 or an alkenyl group having a carbon number of 2 or 3, and more preferably a methyl group; a, and e represent or integers of 1, respectively; b and d represent integers between 1 and 4, respectively; c represents 0 or an integer between 1 and 8; and x represents an integer of 1 or greater, preferably between 10 and 30.

Examples of the component (A) are polymers expressed by the following general formula (2):

preferably one to five, $\equiv$SiH groups for one aliphatic unsaturated hydrocarbon group in the fluorocarbon siloxan as the component (A).

Examples of the fluorocarbon having $\equiv$SiH groups include fluorocarbon siloxan of the unit expressed by the general formula (1) and fluorocarbon siloxan having a unit having a dialkyl hydrogensiloxy group for $R^{10}$ of the general formula (1) and an SiH group as an end group such as a dialkylhydrogen siloxy group or a silyl group, that is expressed by the following general formula (3).

(2)

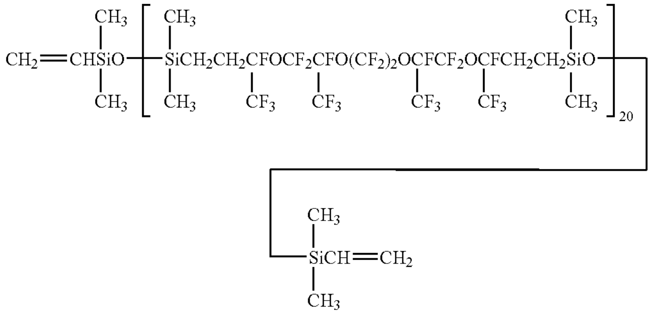

(3)

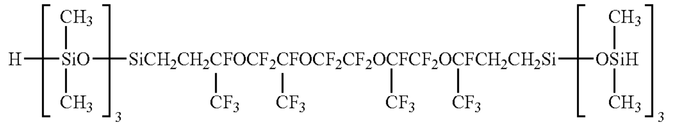

Various fillers conventionally added to general silicone rubber compositions can be used as the component (C). Examples of the fillers include reinforcing fillers of aerosol silica, precipitation silica, carbon powder, titanium dioxides, aluminum oxides, quartz powder, talc, sericite or bentonite, and fibrous fillers such as asbestos, glass fibers or organic fibers.

Examples of the component (D) include various catalysts known as for addition reaction such as chloroplatinic acids; alcohol-modified chloroplatinic; acids; complexes of chloroplatinic acids and olefin; platinum black or palladium supported on a paper sheet substrate of alumina, silica or carbon; complexes of rhodium and olefin; elements of the VIII group of periodic table such as chlorotris (triphenylphosphine) rhodium (Wilkinson catalyst) or rhodium (III) acetylacetonate; and compounds of these elements. It is preferred to use these complexes as a solution with an alcohol solvent, an ether solvent or a hydrocarbon solvent.

The fluorocarbon siloxane rubber composition may be added with various compounding agents as appropriate. Examples of the compounding agents include, but are not limited to, dispersing agents such as diphenylsilanediol, dimethylpolysiloxane with a low degree of polymerization that has a molecular chain ended with a hydroxyl group, or hexamethyldisilazane; thermal resistance improving agents such as ferrous oxides, ferric oxides, cerium oxides or ferric octylate; and coloring agents such as pigments.

The fixing belt is made by coating a heat-resistant film substrate film with a fluorocarbon siloxane rubber composition layer and curing it with heat. Otherwise, it is allowed to form a fluorocarbon siloxane rubber composition layer by coating a release agent liquid diluted with a solvent such as m-xylenehexafluoride or benzotrifluoride by a general coating process such as spray coating, dip coating or knife coating, as appropriate. Although the curing is not bound by temperature and time, it is preferred to cure the coating layer at a temperature in a range of from 100 to 500° C. for a curing time in a range of from 5 seconds to 5 hours according to types of films and belt manufacturing processes. I is preferred that the releasing layer of the fixing belt has a thickness in a range of from 1 to 200 μm, and more preferably in a range of from 5 to 150 μm, in light of satisfactory toner image fixation resulting from an enhanced separation property of the toner or prevention of offset of the toner.

Figure 3:
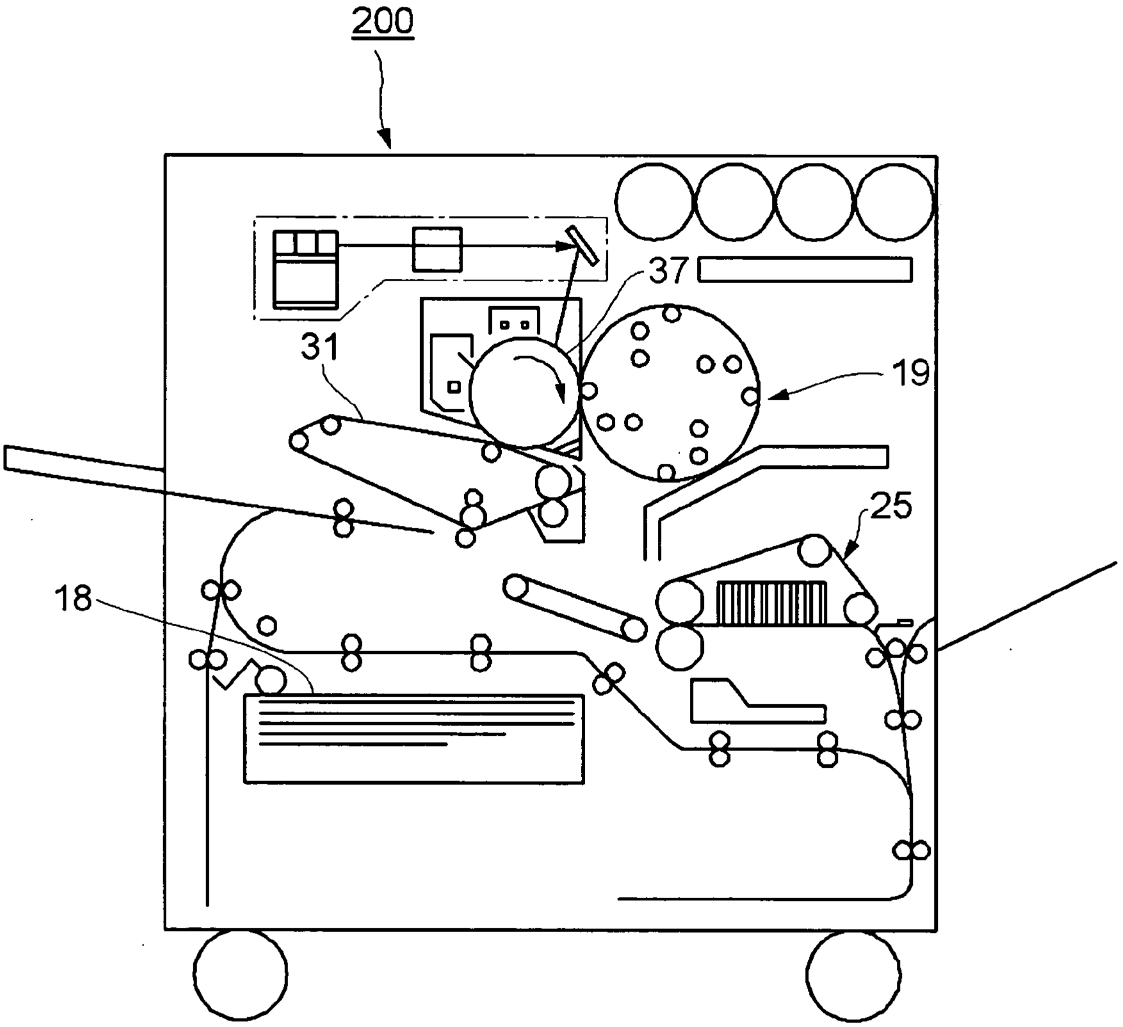
FIG. 3 is a schematic view showing an image printing or recording machine for implementing the image printing or recording method of the present invention by way of example.
Figure 4:
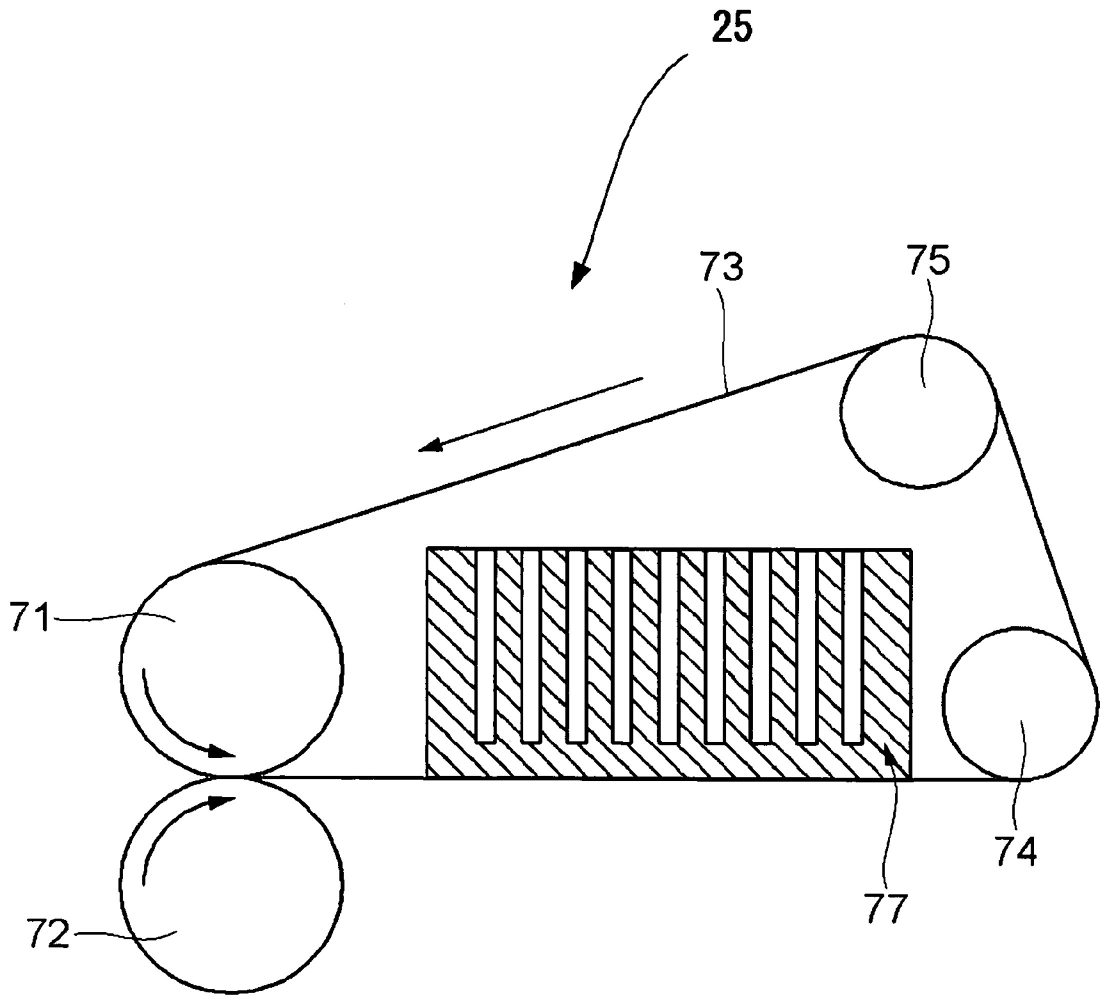
FIG. 4 is a schematic view showing a cooling and peeling type of belt fixing type smoothing machine for use with the image printing or recording method of the present invention by way of example.

FIG. 3 schematically shows a typical image recording apparatus 200, such as, for example, Full Color Laser Printer, Model DCC-500 (Fuji Xerox Co., Ltd.) equipped with a belt-fixing type smoothing device schematically shown in FIG. 4. The machine 200 comprises a photosensitive dram 37, a developing processor 19, an intermediate transfer belt 31, and a belt-fixing type smoothing device 25.

As shown in FIG. 4, the belt-fixing smoothing device 25 comprises a heating roller 71, a separation roller 74 cooperating with the heating roller 71, a tension roller 75, a fixing belt 73 mounted around these rollers 71, 74 and 75 in an endless form, a pressure roller 72 forced against the heating roller 71 through the fixing belt 73, and a heatsink 77 as cooling means disposed between the heating roller 71 and the separation roller 74. The heatsink 77 blows cooling air against the fixing belt 73. image recording sheets are transported by and cooled through the fixing belt 73.

An image recording sheet with a color toner image transferred and fixed to the toner image receiving layer thereof is introduced to a nip between the heating roller 71 and the pressure roller 72 pressed against each other through the fixing belt 73 in such a manner that the toner image receiving layer faces the fixing belt 73. The color toner image is heated and fused at a temperature of approximately 120° to approximately 130° C. while the image recording sheet passes through between the heating roller 71 and the pressure roller 72, so as thereby to be fused and fixed to the image recording sheet. Thereafter, the image recording sheet is transported by the fixing belt 73 in such a way that with the toner image receiving layer remains closely contacted to the fixing belt 73. During transport, the fixing belt 73 is cooled by the heatsink 77, so that the color toner image and the toner imager receiving layer are cooled and, in consequence, cured. Then, when the image recording sheet passes the separation roller 74, it is separated from the fixing belt 73 by the separation roller 74 with the assistance of its own stiffness. After separation of the image recording sheet, a belt cleaner (not shown) cleans the fixing belt 77 to wipe off residual toner particles and dust from the belt surface and renders the fixing belt 77 ready for fixing operation for another image recording sheet.

The image recording medium for ink-jet printing comprises a paper sheet substrate and a color ink receptor layer coated on the paper sheet substrate for receiving liquid ink such as aqueous ink that contains dyes and pigments as a color material or oil-based ink, or solid color ink that is solid at normal temperatures and fused and liquefied upon printing.

The image recording medium for thermal development printing comprises a paper sheet substrate and at least an ink receptor layer coated on the paper sheet substrate for receiving thermal fusion ink. In the thermal development printing, a thermal head heats an ink layer so as to fuse and transfer thermal fusion ink of the ink layer to the ink receptor layer.

The image recording medium for sublimation transfer printing comprises a paper sheet substrate and at least an ink receptor layer on the paper sheet substrate for receiving thermal diffusion sublimation color materials (sublimation color materials). In the sublimation transfer printing, a thermal head heats an ink layer so as to thermally diffuse and transfer a thermal diffusion sublimation color material of the ink layer to the ink receptor layer.

The image recording medium for heat sensitive printing comprises a paper sheet substrate and at least a thermal coloring layer on the paper sheet substrate. The thermal coloring layer is used in a thermo-autochrome method in which images are formed by heating the thermal coloring by a thermal head and fixing it with ultraviolet radiation repeatedly.

The image recording medium for silver halide color photography comprises a paper sheet substrate and at least yellow, magenta and cyan coloring layers on the paper sheet substrate. In the silver halide photography, the silver halide photographic medium after exposure is passed through processing baths for coloring development, bleach-fixing, and washing, respectively, in order and then dried.

The following examples are given as illustrative of the present invention and are not to be considered as limiting.

A paper sheet substrate was made out from a double-sided polyethylene laminate sheet by forming a low-density polyethylene layer on both surfaces of a base paper sheet. Specifically, base paper was made of pulp stock that is prepared by beating wood pulp comprising bleached broadleaf tree pulp (LBKP) to a Canadian Standard Freeness (C.F.S.) of 300 ml using a double disk refiner. The pulp stock was added with 1.0 part by mass of cationic starch, 0.5 parts by mass of alkylketenedimer, 0.5 parts by mass of epoxidized fatty acid amine, 0.3 part by mass of polyamine polyamide epichlorohydrin, 0.03 parts by mass of higher fatty ester, and 0.02 parts of colloidal silica with respect to 100 parts by mass thereof. The end pulp was processed in the form of base paper adjusted to a basic weight of 165 $g/m^2$ by a fourdrinier machine and a thickness of 155 to 175 μm, or a density of 0.94 to 1.06 $g/cm^3$, through calendering. The base paper was coated with a mixture of high-density polyethylene (HDPE) and low-density polyethylene (LDPE) which were blended at a mass ratio of 7:3 (HDPE/LDPE=7/3) on either one of opposite surfaces thereof at a coating temperature of 310° C. in extrusion coating so as to form a 15 μm back layer. Further, the base paper was coated with low-density polyethylene (LDPE) on another surface thereof at a coating temperature of 310° C. in extrusion coating so as to form a 31 μm obverse layer.

EXAMPLE 1

A first example of the image recording sheet (Ex1) was prepared by coating the observe surface of the paper sheet substrate described above with a polymeric layer of 5 μm in dry thickness using a wire coater and then drying the polymeric layer and, subsequently by coating it with a toner image receiving layer of 5 μm in dry thickness over the polymeric layer using a wire coater and then drying it at a maximum temperature of 80° C. for one minute.

The composition for the polymeric layer was prepared by mixing 100 g of acrylic latex such as Hyros HE 1335 (Seiko Chemical Industry Co., Ltd.) and 210 g of water. The composition for the toner image receiving layer was prepared by mixing 100 g of water-dispersant polyester emulsion such as KZA-464S (Unitika Ltd.), 13 g of polyethylene oxide such as Alcoks R1000 (Meisei Chemical Industry Co., Ltd.), 10 g of carnauba wax such as Serzole 524 (Chukyo Oils & Fats Co., Ltd.), 12 g of titanium dioxide such as Taipek RA-220 (Ishiharasangyo Ltd.), and 400 g of water.

EXAMPLE 2

A second example of the image recording sheet (Ex2) was prepared by coating the observe surface of the paper sheet substrate with a polymeric layer of 5 μm in dry thickness using a wire coater and then drying the polymeric layer, and, subsequently, by coating it with a toner image receiving layer of 5 μm in dry thickness over the polymeric layer and then drying it at a maximum temperature of 95° C. for one minute.

The composition for the polymeric layer was prepared by mixing 100 g of acrylic latex such as Hyros HE 1335 (Seiko Chemical Industry Co., Ltd.) and 210 g of water. The composition for the toner image receiving layer was prepared by mixing 100 g of water-dispersant polyester emulsion such as KZA-437S (Unitika Ltd.), 17 g of polyethylene oxide such as Alcoks R1000 (Meisei Chemical Industry Co., Ltd.), 10 g of carnauba wax such as Serzole 524 (Chukyo Oils & Fats Co., Ltd.), 12 g of titanium dioxide such as Taipek RA-220 (Ishiharasangyo Ltd.), and 485 g of water.

COMPARATIVE EXAMPLE 1

A first comparative example of the image recording sheet (Com-Ex1) that has the same configuration as the first example (Ex1) except that an image receiving layer was dried at a maximum temperature of 99° C. for one minute.

COMPARATIVE EXAMPLE 2

A second comparative example of the image recording sheet (Com-Ex2) that has the same configuration as the first example (Ex1) except that an image receiving layer was dried at a maximum temperature of 95° C. for one minute.

COMPARATIVE EXAMPLE 3

A third comparative example of the image recording sheet (Com-Ex3) that has the same configuration as the second example (Ex2) except that an image receiving layer was dried at a maximum temperature of 99° C. for one minute.

Qualitative evaluation was made in connection with probe penetration depth, uneven gloss (the presence or the absence of edge voids), and image qualities for the image recording sheets Ex1, Ex2, Com-Ex1, Com-Ex2 and Com-Ex3.

Probe penetration depth was measured on a Micro-Thermal Analyzer, Model 2990 (T. A. Instrument Corporation) in an indentation test method using three to five cm-square samples of the respective examples of image recording sheets. The Micro-Thermal Analyzer, Model 2990 has a thermal probe that is made of a Pt alloy containing 10% of Rh and has a cantilever spring constant of 1 N/m, a diameter of 6 μm and a curvature radius of 5 μm at an extreme end thereof. Since the thermal probe generates heat with an impression of electric current, a temperature of the thermal probe can be found on the basis of a resistance/temperature characteristic thereof and, therefore, a probe penetration depth can be found from a vertical or Z direction displacement of the thermal probe as a function of temperature that is measured on a AFM Z scanner. Specifically, probe penetration depth for a change in temperature from 50° to 150° C. was measured for the respective samples when the thermal probe was borne against a sample under a load of +20 nA in 4-split T-B (Top-Bottom) value and heated within a range of programmed temperature, namely from a room temperature to 200° C., at a programming rate of 15° C./sec. The measurements are shown in FIG. 2.

An image was printed on the respective examples of image recording sheets using Full Color Laser Printer, Model DCC-500 (Fuji Xerox Co., Ltd.) (shown in FIG. 3) with a fixing unit replaced with the belt-fixing type smoothing device shown in FIG. 4 under the following condition:

Film substrate:
- Polyimide film having
- Thickness: 80 μm
- Width: 50 cm

Releasing layer:
- Material: SIFEL610 (Shinetsu Chemical Industry Co., Ltd.) that is a precursor of fluorocrbone siloxane rubber.

Layer: Valucanized and cured fluorocrbone siloxane rubber layer

Thickness: 50 μm

Heating and pressurizing step:

Cooling device: Heatsink length: 80 mm

Transport velocity: 53 mm/sec

The comparative assessment of uneven gloss due to edge voids was carried out for printed images fixed to the respective examples of image recording sheets at a temperature of 125° C. of the fixing belt by visually examination in the following three grades.

○: Inconspicuous

Δ: Measurably conspicuous

X: Very conspicuous

The comparative assessment of image quality was carried out on glossiness and transfer defects for images of figures, characters, lines different in thickness, yellow/magenta/cyan/black lines and their subtractive mixed color lines, and patches transferred to the respective examples of image recording sheets by visually examination in the following three grades.

| | Penetration Depth (μm) | Uneven Gloss | Image quality |
|---|---|---|---|
| Ex 1 | 0.37 | ○ | ○ |
| Ex 2 | 0.58 | ○ | ○ |
| Com-Ex 1 | 0.32 | X | Δ |
| Com-Ex 2 | 0.32 | X | Δ |
| Com-Ex 3 | 0.28 | X | X |

○: Satisfactory (High image quality)
Δ: Baddish
X: Bad (Low image quality)

From the table and FIG. 2, it is proved that the first and second examples of image recording sheets (Ex1 and Ex2) that have a probe penetration depth of 0.33 μm or greater do not cause edge voids nor conspicuous uneven gloss, and provide higher quality images as compared with any comparative example (Com-Ex1, Com-Ex2 or Com-Ex3) that ha a probe penetration depth less than 0.33 μm.

The recording media of the present invention, that prevent an occurrence of edge voids leading to image defects as uneven gloss and, in consequence, provide high quality images, are suitably used for ink-jet printing, heat sensitive printing, thermal development printing, silver halide photographic printing and printing.

It is to be understood that although the present invention has been described with regard to a preferred embodiments thereof, various other embodiments and variants may occur to those skilled in the art, which are within the scope and spirit of the invention, and such other embodiments and variants are intended to be covered by the following claims.

What is claimed is:

1. A qualification assessment method of assessing an electrophotographic image recording media, comprising the steps:

providing a substrate coated with an image recording layer consisting of at least one thermoplastic layer formed at one side thereof providing a scanning type thermal microscope having a thermal probe operative as both heater and position sensor, the thermal probe comprising a Pt alloy containing 10% of Rh, the thermal probe having a cantilever spring constant of 1 N/in, a diameter of 6 μm and a curvature radius of 5 μm at an extreme end thereof under a condition that said thermal probe is changed in probe temperature at a programming rate in a range of from 0.03° to 25° C./sec within a programmed temperature range of from a room temperature to 200° C. under a load of 20 nA in 4-split T-B (Top-Bottom) value;

using the thermal type scanning microscope and the probe to subject the coated substrate to heated probe penetration analysis by measuring probe penetration depth for a change in temperature of said probe from 50° to 150° C.; and characterizing the tested image recording medium to be competent to form nondefective images if the measured penetration depth is equal to or greater than a predetermined threshold value, and characterizing the image recording medium not to be competent to form nondefective images if the measured penetration depth is less than the predetermined threshold value.

2. The method as defined in claim 1, wherein said predetermined threshold value for probe penetration depth is 0.33 μm.

* * * * *